(12) United States Patent
Yadav et al.

(10) Patent No.: US 7,387,673 B2
(45) Date of Patent: Jun. 17, 2008

(54) COLOR PIGMENT NANOTECHNOLOGY

(75) Inventors: Tapesh Yadav, Longmont, CO (US); Clayton Kostelecky, Longmont, CO (US)

(73) Assignee: PPG Industries Ohio, Inc., Cleveland, OH (US)

( * ) Notice: Subject to any disclaimer, the term of this patent is extended or adjusted under 35 U.S.C. 154(b) by 11 days.

(21) Appl. No.: 10/441,501

(22) Filed: May 20, 2003

(65) Prior Publication Data

US 2003/0209057 A1 Nov. 13, 2003

Related U.S. Application Data

(60) Division of application No. 09/790,036, filed on Feb. 20, 2001, now Pat. No. 6,933,331, which is a division of application No. 09/083,893, filed on May 22, 1998, now Pat. No. 6,228,904, and a continuation-in-part of application No. 08/739,257, filed on Oct. 30, 1996, now Pat. No. 5,905,000, which is a continuation-in-part of application No. 08/730,661, filed on Oct. 11, 1996, now Pat. No. 5,952,040, which is a continuation-in-part of application No. 08/706,819, filed on Sep. 3, 1996, now Pat. No. 5,851,507, and a continuation-in-part of application No. 08/707,341, filed on Sep. 3, 1996, now Pat. No. 5,788,738.

(60) Provisional application No. 60/079,225, filed on Mar. 24, 1998, provisional application No. 60/069,936, filed on Dec. 17, 1997, provisional application No. 60/049,077, filed on Jun. 9, 1997.

(51) Int. Cl.
- C09C 1/00 (2006.01)
- C09C 3/00 (2006.01)
- C09C 3/08 (2006.01)
- C09C 3/10 (2006.01)
- C09C 3/12 (2006.01)

(52) U.S. Cl. .................. 106/499; 106/400; 428/407

(58) Field of Classification Search ............. 423/351, 423/409, 411, 412; 428/403–407; 106/400–506; 977/77, 775–777, 810, 834
See application file for complete search history.

(56) References Cited

U.S. PATENT DOCUMENTS

| | | | |
|---|---|---|---|
| 3,531,413 A | 9/1970 | Rosensweig | |
| 3,635,819 A | 1/1972 | Kaiser | |
| 3,700,575 A | 10/1972 | Paine | |
| 3,764,540 A | 10/1973 | Khalafalla et al. | |
| 3,806,449 A | 4/1974 | Kaiser | |
| 3,917,538 A | 11/1975 | Rosensweig | |
| 3,981,844 A | 9/1976 | Romankiw | |
| 4,017,820 A | 4/1977 | Ross | |
| 4,019,994 A | 4/1977 | Kelley | |
| 4,094,804 A | 6/1978 | Shimoiizaka | |
| 4,208,294 A | 6/1980 | Khalafalla et al. | |
| 4,234,437 A | 11/1980 | Friberg et al. | |
| 4,252,678 A | 2/1981 | Smith | |
| 4,280,918 A | 7/1981 | Homola et al. | |
| 4,292,029 A | 9/1981 | Craig et al. | |
| 4,315,827 A | 2/1982 | Bottenberg et al. | |
| 4,329,241 A | 5/1982 | Massart | |
| 4,356,098 A | 10/1982 | Chagnon | |
| 4,381,244 A | 4/1983 | Berkowitz et al. | |
| 4,381,922 A | 5/1983 | Frey et al. | |
| 4,416,721 A | 11/1983 | Deregibus | |
| 4,426,356 A | 1/1984 | Nair | |
| 4,430,239 A | 2/1984 | Wyman | |
| 4,453,199 A | 6/1984 | Ritchic et al. | |
| 4,484,943 A | 11/1984 | Miura et al. | |
| 4,534,917 A | 8/1985 | Walz | |
| 4,588,575 A | 5/1986 | David | |
| 4,609,608 A | 9/1986 | Solc | |
| 4,610,857 A | 9/1986 | Ogawa et al. | |
| 4,619,845 A | 10/1986 | Ayers et al. | |
| 4,631,952 A | 12/1986 | Donaghey | |
| 4,701,218 A * | 10/1987 | Barker et al. .............. | 106/1.14 |
| 4,721,610 A | 1/1988 | Yoshida et al. | |
| 4,760,296 A | 7/1988 | Johnson et al. | |
| 4,842,832 A | 6/1989 | Inoue et al. | |
| 4,851,262 A | 7/1989 | McFeaters | |
| 4,857,492 A | 8/1989 | Bradley et al. | |
| 4,944,985 A | 7/1990 | Alexander et al. | |
| 4,984,446 A | 1/1991 | Yagawara et al. | |
| 4,988,539 A | 1/1991 | Breuil et al. | |
| 5,030,669 A * | 7/1991 | Hendrickson et al. ...... | 523/333 |

(Continued)

OTHER PUBLICATIONS

Definition of pigment: Grant&Hackh's Chemical Dictionary, 1989.*

(Continued)

Primary Examiner—C. Melissa Koslow

(57) ABSTRACT

A pigment prepared using nanofillers with modified properties because of the powder size being below 100 nanometers. Blue, yellow and brown pigments are illustrated. Nanoscale coated, un-coated, nanorods type fillers are included. The pigment nanopowders taught comprise one or more elements from the group actinium, antimony, aluminum, arsenic, barium, beryllium, bismuth, cadmium, calcium, cerium, cesium, cobalt, copper, dysprosium, erbium, europium, gadolinium, gallium, gold, hafnium, hydrogen, indium, iridium, iron, lanthanum, lithium, magnesium, manganese, mendelevium, mercury, molybdenum, neodymium, neptunium, nickel, niobium, nitrogen, oxygen, osmium, palladium, platinum, potassium, praseodymium, promethium, protactinium, rhenium, rubidium, scandium, silver, sodium, strontium, sulfur, selenium, tantalum, terbium, thallium, thorium, tin, titanium, tungsten, vanadium, ytterbium, yttrium, zinc, and zirconium.

15 Claims, 6 Drawing Sheets

U.S. PATENT DOCUMENTS

| | | | |
|---|---|---|---|
| 5,093,286 A | 3/1992 | Nogami et al. | |
| 5,130,210 A | 7/1992 | Iwasaki et al. | |
| 5,130,277 A | 7/1992 | Ueda et al. | |
| 5,187,209 A | 2/1993 | Hirai et al. | |
| 5,190,583 A | 3/1993 | Menzel et al. | |
| 5,194,128 A | 3/1993 | Beaty et al. | |
| 5,215,580 A * | 6/1993 | Elfenthal et al. | 106/441 |
| 5,252,949 A | 10/1993 | Kirby et al. | |
| 5,258,338 A | 11/1993 | Maher | |
| 5,264,157 A | 11/1993 | Bidan et al. | |
| 5,308,804 A | 5/1994 | Lee | |
| 5,334,292 A | 8/1994 | Rajeshwar et al. | |
| 5,350,641 A | 9/1994 | Mogensen et al. | |
| 5,356,842 A | 10/1994 | Yamakawa et al. | |
| 5,368,951 A | 11/1994 | Shiratori et al. | |
| 5,381,664 A | 1/1995 | Bennett et al. | |
| 5,385,776 A | 1/1995 | Maxfield et al. | |
| 5,387,462 A | 2/1995 | Debe | |
| 5,403,375 A | 4/1995 | König et al. | |
| 5,407,458 A | 4/1995 | König et al. | |
| 5,414,588 A | 5/1995 | Barbee, Jr. et al. | |
| 5,417,956 A | 5/1995 | Moser | |
| 5,420,083 A | 5/1995 | Brandt | |
| 5,427,672 A | 6/1995 | Böcker et al. | |
| 5,433,906 A | 7/1995 | Dasch et al. | |
| 5,447,708 A | 9/1995 | Helble et al. | |
| 5,460,830 A | 10/1995 | Kossovsky et al. | |
| 5,462,751 A | 10/1995 | Kossovsky et al. | |
| 5,462,903 A | 10/1995 | Rousset et al. | |
| 5,466,575 A | 11/1995 | Cozzette et al. | |
| 5,468,358 A | 11/1995 | Ohkawa et al. | |
| 5,472,477 A | 12/1995 | König | |
| 5,476,003 A | 12/1995 | Neumann | |
| 5,482,656 A | 1/1996 | Hiraoka et al. | |
| 5,486,277 A | 1/1996 | Barbee, Jr. et al. | |
| 5,527,849 A | 6/1996 | Roman et al. | |
| 5,539,965 A | 7/1996 | Safari et al. | |
| 5,548,000 A | 8/1996 | Nagel et al. | |
| 5,548,474 A | 8/1996 | Chen et al. | |
| 5,560,960 A | 10/1996 | Singh et al. | |
| 5,571,401 A | 11/1996 | Lewis et al. | |
| 5,571,612 A | 11/1996 | Motohiro et al. | |
| 5,590,387 A | 12/1996 | Schmidt et al. | |
| 5,614,011 A | 3/1997 | Binder et al. | |
| 5,618,475 A | 4/1997 | Johnson et al. | |
| 5,629,075 A | 5/1997 | Ishikawa et al. | |
| 5,629,474 A | 5/1997 | Williams | |
| 5,635,654 A | 6/1997 | Hebsur et al. | |
| 5,650,156 A | 7/1997 | Grinstaff et al. | |
| 5,665,807 A | 9/1997 | Roman et al. | |
| 5,679,471 A | 10/1997 | Cheng et al. | |
| 5,690,706 A | 11/1997 | Sigalas et al. | |
| 5,709,786 A | 1/1998 | Friese et al. | |
| 5,718,047 A | 2/1998 | Nakayama et al. | |
| 5,739,193 A | 4/1998 | Walpita et al. | |
| 5,858,080 A * | 1/1999 | Bugnon | 106/479 |
| 5,880,197 A | 3/1999 | Beall et al. | |
| 5,905,000 A | 5/1999 | Yadav et al. | |
| 5,922,537 A | 7/1999 | Ewart et al. | |
| 6,027,742 A | 2/2000 | Lee et al. | |
| 6,045,925 A | 4/2000 | Klabunde et al. | |
| 6,080,232 A | 6/2000 | Sperlich et al. | |
| 6,109,095 A | 8/2000 | Addiego | |
| 6,110,399 A | 8/2000 | McArdle et al. | |
| 6,110,557 A | 8/2000 | Weir et al. | |
| 6,114,038 A | 9/2000 | Castro et al. | |
| 6,117,541 A | 9/2000 | Frisk | |
| 6,127,450 A | 10/2000 | Angeletakis | |
| 6,139,618 A * | 10/2000 | Hayashi et al. | 106/456 |
| 6,162,532 A | 12/2000 | Black et al. | |
| 6,170,292 B1 | 1/2001 | Boulos et al. | |
| 6,180,389 B1 | 1/2001 | Douglas et al. | |
| 6,194,481 B1 | 2/2001 | Furman et al. | |
| 6,214,368 B1 | 4/2001 | Lee et al. | |
| 6,258,974 B1 | 7/2001 | Wellinghoff et al. | |
| 6,270,347 B1 | 8/2001 | Webster et al. | |
| 6,291,070 B1 | 9/2001 | Arpac et al. | |
| 6,294,009 B1 | 9/2001 | Letschert et al. | |
| 6,306,610 B1 | 10/2001 | Bawendi et al. | |
| 6,312,831 B1 | 11/2001 | Crawley et al. | |
| 6,326,144 B1 | 12/2001 | Bawendi et al. | |
| 6,331,312 B1 | 12/2001 | Lee et al. | |
| 6,375,864 B1 | 4/2002 | Phillips et al. | |
| 6,387,981 B1 | 5/2002 | Zhang et al. | |
| 6,399,037 B1 | 6/2002 | Pflug et al. | |
| 6,410,765 B1 | 6/2002 | Wellinghoff et al. | |
| 6,416,868 B1 | 7/2002 | Sullivan et al. | |
| 6,432,866 B1 | 8/2002 | Tennent et al. | |
| 6,440,243 B1 | 8/2002 | Tan et al. | |
| 6,440,561 B2 * | 8/2002 | Hayashi et al. | 428/407 |
| 6,468,808 B1 | 10/2002 | Nie et al. | |
| 6,485,557 B1 * | 11/2002 | Swiler | 106/479 |
| 6,498,208 B2 | 12/2002 | Border et al. | |
| 6,503,316 B1 | 1/2003 | Sakoske et al. | |
| 6,541,112 B1 * | 4/2003 | Swiler et al. | 428/402 |
| 6,572,693 B1 | 6/2003 | Wu et al. | |
| 6,623,557 B2 * | 9/2003 | Hayashi et al. | 106/499 |
| 6,663,948 B1 | 12/2003 | Takiyama et al. | |
| 6,667,360 B1 | 12/2003 | Ng et al. | |
| 6,682,872 B2 | 1/2004 | Sachdev et al. | |
| 6,689,823 B1 | 2/2004 | Bellare et al. | |
| 6,693,143 B2 | 2/2004 | Pflug | |
| 6,800,127 B2 * | 10/2004 | Babler | 106/493 |
| 6,830,822 B2 * | 12/2004 | Yadav | 428/552 |
| 6,849,109 B2 * | 2/2005 | Yadav et al. | 106/31.13 |
| 2003/0017336 A1 | 1/2003 | Gedanken et al. | |
| 2004/0139820 A1 | 7/2004 | Kodas et al. | |
| 2004/0180203 A1 | 9/2004 | Yadav et al. | |

OTHER PUBLICATIONS

Definition of pigment" Hawley's Condensed Chemical Dictionary, 1993.*
U.S. Appl. No. 10/426,414, filed Apr. 30, 2003.
U.S. Appl. No. 10/424,395, filed Apr. 28, 2003.
U.S. Appl. No. 10/434,828, filed May 9, 2003.
U.S. Appl. No. 10/435,287, filed May 9, 2003.
U.S. Appl. No. 10/435,222, filed May 20, 2003.
U.S. Appl. No. 10/441,501, filed May 20, 2003.
U.S. Appl. No. 10/679,611, filed Oct. 6, 2003.

* cited by examiner

XRD spectra of the indium tin oxide nanopowder

COLOR PIGMENT NANOTECHNOLOGY

RELATED APPLICATIONS

This application is a divisional of U.S. patent application Ser. No. 09/790,036 now U.S. Pat. No. 6,933,331 titled "NANOTECHNOLOGY FOR DRUG DELIVERY, CONTRAST AGENTS AND BIOMEDICAL IMPLANTS" filed on Feb. 20, 2001 which is a divisional of application Ser. No. 09/083,893, U.S. Pat. No. 6,228,904 filed on May 22, 1998, which is incorporated herein by reference and which claims the benefit of U.S. Provisional applications 60/049,077 filed on Jun. 9, 1997, 60/069,936 filed on Dec. 17, 1997, and 60/079,225 filed on Mar. 24, 1998. Application Ser. No. 09/083,893 is a continuation-in-part of U.S. patent application Ser. No. 08/739,257, filed Oct. 30, 1996, now U.S. Pat. No. 5,905,000, titled NANOSTRUCTURED ION CONDUCTING SOLID ELECTROLYTES, which is a continuation-in-part of U.S. Ser. No. 08/730,661, filed Oct. 11, 1996, now U.S. Pat. No. 5,952,040 titled "PASSIVE ELECTRONIC COMPONENTS FROM NANO-PRECISION ENGINEERED MATERIALS" which is a continuation-in-part of U.S. Ser. No. 08/706,819, filed Sep. 3, 1996, now U.S. Pat. No. 5,851,507 titled "INTEGRATED THERMAL PROCESS FOR THE CONTINUOUS SYNTHESIS OF NANOSCALE POWDERS" and U.S. Ser. No. 08/707,341, filed Sep. 3, 1996, now U.S. Pat. No. 5,788,738 titled "METHOD OF PRODUCING NANOSCALE POWDERS BY QUENCHING OF VAPORS".

BACKGROUND OF THE INVENTION

1. Field of the Invention

This invention relates to the use of nanoscale powders as a component of novel composites and devices. By incorporating powders having dimensions less than a characteristic domain size into polymeric and other matrices, nanocomposites with unique properties can be produced.

In one aspect, the invention comprises a nanostructured filler, intimately mixed with a matrix to form a nanostructured composite. At least one of the nanostructured filler and the nanostructured composite has a desired material property which differs by at least 20% from the same material property for a micron-scale filler or a micron-scale composite, respectively. The desired material property is selected from the group consisting of refractive index, transparency to light, reflection characteristics, resistivity, permittivity, permeability, coercivity, B-H product, magnetic hysteresis, breakdown voltage, skin depth, Curie temperature, dissipation factor, work function, band gap, electromagnetic shielding effectiveness, radiation hardness, chemical reactivity, thermal conductivity, temperature coefficient of an electrical property, voltage coefficient of an electrical property, thermal shock resistance, biocompatibility and wear rate.

The nanostructured filler may comprise one or more elements selected from the s, p, d, and f groups of the periodic table, or it may comprise a compound of one or more such elements with one or more suitable anions, such as aluminum, antimony, boron, bromine, carbon, chlorine, fluorine, germanium, hydrogen, indium, iodine, nickel, nitrogen, oxygen, phosphorus, selenium, silicon, sulfur, or tellurium. The matrix may be a polymer (e.g., poly(methyl methacrylate), poly(vinyl alcohol), polycarbonate, polyalkene, or polyaryl), a ceramic (e.g., zinc oxide, indium-tin oxide, hafnium carbide, or ferrite), or a metal (e.g., copper, tin, zinc, or iron). Loadings of the nanofiller may be as high as 95%, although loadings of 80% or less are preferred. The invention also comprises devices which incorporate the nanofiller (e.g., electrical, magnetic, optical, biomedical, and electrochemical devices).

Another aspect of the invention comprises a method of producing a composite, comprising blending a nanoscale filler with a matrix to form a nanostructured composite. Either the nanostructured filler or the composite itself differs substantially in a desired material property from a micron-scale filler or composite, respectively. The desired material property is selected from the group consisting of refractive index, transparency to light, reflection characteristics, resistivity, permittivity, permeability, coercivity, B-H product, magnetic hysteresis, breakdown voltage, skin depth, Curie temperature, dissipation factor, work function, band gap, electromagnetic shielding effectiveness, radiation hardness, chemical reactivity, thermal conductivity, temperature coefficient of an electrical property, voltage coefficient of an electrical property, thermal shock resistance, biocompatibility, and wear rate. The loading of the filler does not exceed 95 volume percent, and loadings of 80 volume percent or less are preferred.

The composite may be formed by mixing a precursor of the matrix material with the nanofiller, and then processing the precursor to form a desired matrix material. For example, the nanofiller may be mixed with a monomer, which is then polymerized to form a polymer matrix composite. In another embodiment, the nanofiller may be mixed with a matrix powder composition and compacted to form a solid composite. In yet another embodiment, the matrix composition may be dissolved in a solvent and mixed with the nanofiller, and then the solvent may be removed to form a solid composite. In still another embodiment, the matrix may be a liquid or have liquid like properties.

Many nanofiller compositions are encompassed within the scope of the invention, including nanofillers comprising one or more elements selected from the group consisting of actinium, aluminum, arsenic, barium, beryllium, bismuth, cadmium, calcium, cerium, cesium, cobalt, copper, dysprosium, erbium, europium, gadolinium, gallium, gold, hafnium, hydrogen, indium, iridium, iron, lanthanum, lithium, magnesium, manganese, mendelevium, mercury, molybdenum, neodymium, neptunium, nickel, niobium, osmium, palladium, platinum, potassium, praseodymium, promethium, protactinium, rhenium, rubidium, scandium, silver, sodium, strontium, tantalum, terbium, thallium, thorium, tin, titanium, tungsten, vanadium, ytterbium, yttrium, zinc, and zirconium.

"Domain size" as that term is used herein, refers to the minimum dimension of a particular material morphology. In the case of powders, the domain size is the grain size. In the case of whiskers and fibers, the domain size is the diameter. In the case of plates and films, the domain size is the thickness.

As used herein, a "nanostructured powder" is one having a domain size of less than 100 nm, or alternatively, having a domain size sufficiently small that a selected material property is substantially different from that of a micron-scale powder, due to size confinement effects (e.g., the property may differ by 20% or more from the analogous property of the micron-scale material). Nanostructured powders often advantageously have sizes as small as 50 nm, 30 nm, or even smaller. Nanostructured powders may also be referred to as "nanopowders" or "nanofillers." A nanostructured composite is a composite comprising a nanostructured phase dispersed in a matrix.

As it is used herein, the term "agglomerated" describes a powder in which at least some individual particles of the powder adhere to neighboring particles, primarily by electrostatic forces, and "aggregated" describes a powder in which at least some individual particles are chemically bonded to neighboring particles.

2. Relevant Background

A very wide variety of pure phase materials such as polymers are now readily available at low cost. However, low cost pure phase materials are somewhat limited in the achievable ranges of a number of properties, including, for example, electrical conductivity, magnetic permeability, dielectric constant, and thermal conductivity. In order to circumvent these limitations, it has become common to form composites, in which a matrix is blended with a filler material with desirable properties. Examples of these types of composites include the carbon black and ferrite mixed polymers that are used in toners, tires, electrical devices, and magnetic tapes.

The number of suitable filler materials for composites is large, but still limited. In particular, difficulties in fabrication of such composites often arise due to issues of interface stability between the filler and the matrix, and because of the difficulty of orienting and homogenizing filler material in the matrix. Some desirable properties of the matrix (e.g., rheology) may also be lost when certain fillers are added, particularly at the high loads required by many applications. The availability of new filler materials, particularly materials with novel properties, would significantly expand the scope of manufacturable composites of this type.

SUMMARY OF THE INVENTION

Briefly stated, the present invention is directed to pigments based on novel nanofillers that enhance a wide range of properties. In another aspect, the present invention is directed to methods for preparing pigment nanocomposites offering superior functional performance. In an example method, nanofillers and a substance having a polymer are mixed. Both low-loaded and highly-loaded nanocomposites are contemplated. Nanoscale coated and un-coated fillers may be used. Nanocomposite films may be coated on substrates.

BRIEF DESCRIPTION OF THE DRAWINGS

The invention is described with reference to the several figures of the drawing, in which.

DETAILED DESCRIPTION OF THE PREFERRED EMBODIMENTS

Figure 1:
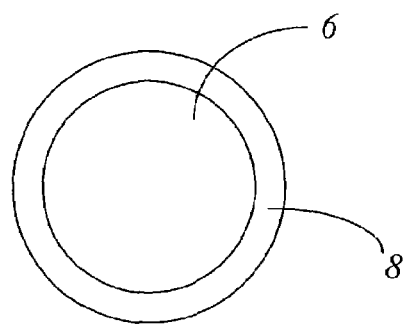
FIG. 1 is a diagram of a nanostructured filler coated with a polymer.

In some embodiments, the present invention is a pigment comprising polymetallic nanofillers, wherein the polymetallic nanofillers are produced using a method comprising:

providing a solution for each of one or more desired constituent elements of a desired polymetallic nanofiller;

mixing the solutions containing each of the constituent elements of the desired polymetallic nanofiller to form a mix of solutions;

preparing polymetallic nanofillers from the mix of solutions in a thermal plasma process;

mixing the polymetallic nanofillers in a liquid matrix; and wherein the polymetallic nanofillers have a domain size less than 100 nanometers. In some embodiments, the present invention is a layer prepared from the pigment. In some embodiments, the liquid matrix comprises of an organic fluid. In some embodiments, the polymetallic nanofillers are coated. In some embodiments, the polymetallic nanofillers comprise oxide. In some embodiments, the polymetallic nanofillers comprise nanorods. In some embodiments, the polymetallic nanofillers comprise nanowhiskers. In some embodiments, the pigment is yellow. In some embodiments, the pigment is blue. In some embodiments, the pigment is brown. In some embodiments, the nanofillers comprise nitride.

Prior art filler materials for polymeric composites are usually powders with an average dimension in the range of 10-100 μm. Thus, each filler particle typically has on the order of $10^{15}$-$10^{18}$ atoms. In contrast the typical polymer chain has on the order of $10^3$-$10^9$ atoms. While the art of precision manufacturing of polymers at molecular levels is well-developed, the knowledge of precision manufacturing of filler materials at molecular levels has remained largely unexplored.

The number of atoms in the filler particles of the invention (hereinafter called "nanostructured filler" or "nanofiller") is on the order of or significantly less than the number of atoms in the polymer molecules, e.g., $10^2$-$10^{10}$. Thus, the filler particles are comparable in size or smaller than the polymer molecules, and therefore can be dispersed with orders of magnitude higher number density. Further, the fillers may have a dimension less than or equal to the critical domain sizes that determine the characteristic properties of the bulk composition; thus, the fillers may have significantly different physical properties from larger particles of the same composition. This in turn may yield markedly different properties in composites using nanofillers as compared to the typical properties of conventional polymer composites.

These nanostructured filler materials may also have utility in the manufacture of other types of composites, such as ceramic- or metal-matrix composites. Again, the changes in the physical properties of the filler particles due to their increased surface area and constrained domain sizes can yield changes in the achievable properties of composites.

The nanofillers of the invention can be inorganic, organic, or metallic, and may be in the form of powders, whiskers, fibers, plates or films. The fillers represent an additive to the overall composite composition, and may be used at loadings of up to 95% by volume. The fillers may have connectivity in 0, 1, 2, or 3 dimensions. Fillers may be produced by a variety of methods, such as those described in U.S. Pat. Nos. 5,486,675; 5,447,708; 5,407,458; 5,219,804; 5,194,128; and 5,064,464. Particularly preferred methods of making nanostructured fillers are described in U.S. patent application Ser. No. 09/046,465, by Bickmore, et al., filed Mar. 23, 1998, now U.S. Pat. No. 5,984,997 and Ser. No. 08/706,819, by Pirzada, et al., filed Sep. 3, 1996, now U.S. Pat. No. 5,851,507 both of which are incorporated herein by reference.

A method of making nanostructured fillers is described in commonly owned U.S. patent application Ser. No. 09/046,465, by Bickmore, et al., filed Mar. 23, 1998, now U.S. Pat. No. 5,984,997 which is herewith recited. For example, if a doped complex of composition:

$$d_1-M_1M_2X$$

is desired, then according to the invention, one should prepare solutions or suspensions of dopant $d_1$, metals $M_1$ and $M_2$, and anion X, where $M_1$ and $M_2$ are selected from the s, p, f, and d groups of the periodic table, and X is selected from the p group of the periodic table. Solutions or suspensions may be prepared, for example, by mixing solutions containing each of the constituent elements of the desired powder. Elements dopant $d_1$, metals $M_1$ and $M_2$ are selected from the group consisting of the s group, p group, d group, or f group of the periodic table, and X is selected from the group consisting of carbon, nitrogen, oxygen, boron, phosphorus, sulfur, chalcogens, and halogens.

It will be understood by those skilled in the art that powders comprising larger numbers of dopants, metals, and anions can also be produced by the same methods. In particular, polymetallic materials comprising at least three metals and at least one anion can be produced. These materials are useful in the manufacture of capacitors, inductors, varistors, resistors, piezo-devices, thermistors, thermoelectric devices, filters, connectors, magnets, ion-conducting devices, sensors, fuel cells, catalysts, optics, photonic devices, lasers, tooling bits, armor, superconductors, inks, and pigments, for example. Prior art polymetallic powders are limited to sizes in excess of 300 nm, and mostly to sizes in excess of 1 micrometer. By the methods of the invention, solid or porous polymetallic nanopowders can be made, with sizes less than 250 nm, and preferably less than 100 nm. Furthermore, by the methods of the invention, nano-whiskers and nano-rods can be produced with aspect ratios of 25 or less, having a minimum dimension of less than 250 nm, and preferably less than 100 nm. At this scale, size confinement effects can come into play for many polymetallic powders.

While this invention does not limit itself to a specific cation or anion, it is desirable to use anions and cations that are either part of the final product or completely volatile. The final products are not limited to ionic materials, and include covalent and mixed ionic-covalent materials such as carbides, borides, nitrides, sulfides, oxycarbides, oxynitrides, oxyborides and oxysulfides. Illustrative formulations, but not exhaustive, then are nitrate, nitrites, nitrites, nitrides, carbonates, bicarbonates, hydroxides, cyanos, organometallics, carboxylates, amines, and amides.

As noted in U.S. Pat. No. 5,984,997, incorporated by reference herein, according to the invention, at least one component acts as a fuel. The fuel component can be part of one of the solution phases or can be separately added to achieve combustibility. Emulsifying agents and dispersants may also be added to homogenize or stabilize the emulsion, to enhance combustion, or to achieve a combination of these characteristics.

The emulsions are pumped directly and atomized, or, alternatively, carried in a gas or a mix of gases that do not possess or do not contribute an element that is not desired in the final composition. Preferred carrier stream gases are nitrogen, air, oxygen, argon, helium, neon, and xenon. It is also within the scope of the invention to include in the carrier stream a reactant such as ammonia gas.

The emulsion is then combusted using designs such as, but not limited to, those taught by Khavkin (Combustion System Design, PennWell Books, Tulsa Okla., 1996) and Fischer (Combustion Engineer's Handbook, G. Newnes Publisher, London, 1961), which are incorporated herein by reference. The combustion can be accomplished using a laminar or turbulent flame, a premixed or diffusion flame, a co-axial or impinging flame, a low-pressure or high-pressure flame, a sub-sonic or sonic or super-sonic flame, a pulsating or continuous flame, an externally applied electromagnetic field free or externally applied electromagnetic field influenced flame, a reducing or oxidizing flame, a lean or rich flame, a secondary gas doped or undoped flame, a secondary liquid doped or undoped flame, a secondary particulate doped or undoped flame, an adiabatic or non-adiabatic flame, a one-dimensional or two-dimensional or three-dimensional flame, an obstruction-free or obstructed flame, a closed or open flame, an externally heated or externally cooled flame, a pre-cooled or pre-heated flame, a one burner or multiple burner flame, or a combination of one or more of the above. Usually, combustion temperatures will be in excess of 600 C, a temperature at which diffusion kinetics will be sufficiently fast that a compositionally uniform powder will be produced.

The emulsion can also be a feed to other processes of producing nanoscale powders. Examples include the powder-formation processes described in copending and commonly assigned U.S. patent application Ser. No. 08/707,341 now U.S. Pat. No. 5,788,738, "Boundary Layer Joule—Thompson Nozzle for Thermal Quenching of High Temperature Vapors," and Ser. No. 08/706,819 now U.S. Pat. No. 5,851,507, "Integrated Thermal Process and Apparatus for the Continuous Synthesis of Nanoscale Powders," both of which are incorporated herein by reference.

The combustion products are quenched if appropriate and then collected. In practicing the invention, it is preferred that the product gases be quenched to freeze the growth and further reaction of the product. This can be accomplished in numerous ways. Some illustrations include, but are not limited to, expansion of gases, addition of coolant gases or liquids, addition of materials which absorb heat (for example, heat absorption associated with phase transformation of liquid nitrogen to gaseous nitrogen), radiative cooling, conductive cooling, convective cooling, application of cooled surface, or impinging into liquid. The preferred method in this invention is radiative cooling. It is suggested that the gas stream containing the fine powder be protected from contamination, and that steps be taken to prevent the deposition of the powders to the walls. This can be achieved by using methods such as active cooling, or by using confinement gas stream, e.g., a blanket of inert gases along the walls of the reactor. The use of confinement blanket gas stream all along the periphery of the product stream also minimizes or prevents the deposition of fine powders to the walls of the reactor from thermophoresis.

The fine powder-containing stream is then separated into gas and solid stream. The separation can be accomplished using numerous methods. Some illustrative methods are the use of bag houses containing polymeric or inorganic filters, electrostatic filtration, surface deposition on cold surfaces followed by scraping with a blade, centrifugal separation, in-situ deposition in porous media, and absorption or adsorption in liquids or solids. A preferred method is the use of bag houses.

A wide variety of nanofiller compositions are possible. Some exemplary compositions include metals (e.g., Cu, Ag, Ni, Fe, Al, Pd, and Ti), oxide ceramics (e.g., $TiO_2$, $TiO_{2-x}$, $BaFe_2O_4$, dielectric compositions, ferrites, and manganites), carbide ceramics (e.g., SiC, BC, TiC, WC, WCsub.1-x), nitride ceramics (e.g., $Si_3N_4$, TiN, VN, AlN, and $Mo_2N$), hydroxides (e.g., aluminum hydroxide, calcium hydroxide, and barium hydroxide), borides (e.g., $AlB_2$ and $TiB_2$), phosphides (e.g., NiP and VP), sulfides (e.g., molybdenum sulfide, titanium sulfide, and tungsten sulfide), silicides (e.g., $MoSi_2$), chalcogenides (e.g., $Bi_2Te_3$, $Bi_2Se_3$), and combinations of these.

The fillers are immediately mixed with a matrix material, which is preferably polymeric, but may also be ceramic, metallic, or a combination of the above. The matrix may be chosen for properties such as ease of processability, low cost, environmental benignity, commercial availability, and compatibility with the desired filler. The fillers are preferably mixed homogeneously into the matrix, but may also be mixed heterogeneously if desired, for example to obtain a composite having a gradient of some property. Mixing techniques for incorporating powders into fluids and for mixing different powders are well known in the art, and include mechanical, thermal, electrical, magnetic, and chemical momentum transfer techniques, as well as combinations of the above.

The viscosity, surface tension, and density of a liquid matrix material can be varied for mixing purposes, the preferred values being those that favor ease of mixing and that reduce energy needed to mix without introducing any undesirable contamination. One method of mixing is to dissolve the matrix in a solvent which does not adversely affect the properties of the matrix or the filler and which can be easily removed and recovered. Another method is to melt the matrix, incorporate the filler, and cool the mixture to yield a solid composite with the desired properties. Yet another method is to synthesize the matrix in-situ with the filler present. For example, the nanofiller can be mixed with a liquid monomer, which can then be polymerized to form the composite. In this method, the filler may be used as a catalyst or co-catalyst for polymerization. The mixing may also be accomplished in the solid state, for example by mixing a powdered matrix composition with the filler, and then compacting the mixture to form a solid composite.

Mixing can be assisted using various secondary species such as dispersants, binders, modifiers, detergents, and additives. Secondary species may also be added to enhance one to more of the properties of the filler-matrix composite.

Mixing can also be assisted by pre-coating the nanofiller with a thin layer of the matrix composition or with a phase that is compatible with the matrix composition. Such a coated nanoparticle is illustrated in FIG. 1, which shows a spherical nanoparticle 6 and a coating 8. In one embodiment, when embedding nanofillers in a polymer matrix, it may be desirable to coat the filler particles with a related monomer. When mixing nanofillers into a ceramic matrix, pre-coating can be done by forming a ceramic layer around the nanoscale filler particle during or after the synthesis of the nanoscale filler, by methods such as partial oxidation, nitridation, carborization, or boronation. In these methods, the nanostructured filler is exposed to a small concentration of a precursor that reacts with the surface of the filler to form a ceramic coating. For example, a particle may be exposed to oxygen in order to create an oxide coating, to ammonia in order to create a nitride coating, to borane to create a boride coating, or to methane to create a carbide coating. It is important that the amount of precursor be small, to prevent thermal runaway and consequent conversion of the nanostructured filler into a ceramic particle.

In case of polymer matrix, the filler can be coated with a polymer or a monomer by numerous methods, for example, surface coating in-situ, spray drying a dispersion of filler and polymer solution, co-polymerization on the filler surface, and melt spinning followed by milling. A preferred method is surface coating in-situ. In this process, the filler is first suspended in demineralized water (or another solvent) and the suspension's pH is measured. The pH is then adjusted and stabilized with small addition of acid (e.g., acetic acid or dilute nitric acid) or base (e.g., ammonium hydroxide or dilute sodium hydroxide). The pH adjustment produces a charged state on the surface of the filler. Once a desired pH has been achieved, a coating material (for example, a polymer or other appropriate precursor) with opposite charge is introduced into the solvent. This step results in coupling of the coating material around the nanoscale filler and formation of a coating layer around the nanoscale filler. Once the layer has formed, the filler is removed from the solvent by drying, filtration, centrifugation, or any other method appropriate for solid-liquid separation. This technique of coating a filler with another material using surface charge can be used for a variety of organic and inorganic compositions.

When a solvent is used to apply a coating as in the in-situ surface coating method described above, the matrix may also be dissolved in the solvent before or during coating, and the final composite formed by removing the solvent.

A very wide range of material properties can be engineered by the practice of the invention. For example, electrical, magnetic, optical, electrochemical, chemical, thermal, biomedical, and tribological properties can be varied over a wider range than is possible using prior art micron-scale composites.

Nanostructured fillers can be used to lower or raise the effective resistivity, effective permittivity, and effective permeability of a polymer or ceramic matrix. While these effects are present at lower loadings, they are expected to be most pronounced for filler loadings at or above the percolation limit of the filler in the matrix (i.e., at loadings sufficiently high that electrical continuity exists between the filler particles). Other electrical properties which may be engineered include breakdown voltage, skin depth, Curie temperature, temperature coefficient of electrical property, voltage coefficient of electrical property, dissipation factor, work function, band gap, electromagnetic shielding effectiveness and degree of radiation hardness. Nanostructured fillers can also be used to engineer magnetic properties such as the coercivity, B-H product, hysteresis, and shape of the B-H curve of a matrix.

An important characteristic of optical material is its refractive index and its transmission and reflective characteristics. Nanostructured fillers may be used to produce composites with refractive index engineered for a particular application. Gradient lenses may be produced using nanostructured materials. Gradient lenses produced from nanostructured composites may reduce or eliminate the need for polishing lenses. The use of nanostructured fillers may also help filter specific wavelengths. Furthermore, a key advantage of nanostructured fillers in optical applications is expected to be their enhanced transparency because the domain size of nanostructured fillers ranges from about the same as to more than an order of magnitude less than visible wavelengths of light.

The high surface area and small grain size of nanofilled composites make them excellent candidates for chemical and electrochemical applications. When used to form electrodes for electrochemical devices, these materials are expected to significantly improve performance, for example by increasing power density in batteries and reducing minimum operating temperatures for sensors. (An example of the latter effect can be found in copending and commonly assigned U.S. application Ser. No. 08/739,257, "Nanostructured Ion Conducting Solid Electrolytes," by Yadav, et al. now U.S. Pat. No. 5,905,000). Nanostructured fillers are also expected to modify the chemical properties of composites. These fillers are catalytically more active, and provide more interface area for interacting with diffusive species. Such fillers may, for example, modify chemical stability and mobility of diffusing gases. Furthermore, nanostructured fillers may enhance the chemical properties of propellants and fuels.

Many nanostructured fillers have a domain size comparable to the typical mean free path of phonons at moderate temperatures. It is thus anticipated that these fillers may have dramatic effects on the thermal conductivity and thermal shock resistance of matrices into which they are incorporated.

Nanostructured fillers—in coated and uncoated form—and nanofilled composites are also expected to have significant value in biomedical applications for both humans and animals. For example, the small size of nanostructured fillers may make them readily transportable through pores and capillaries. This suggests that the fillers may be of use in developing novel time-release drugs and methods of administration and delivery of drugs, markers, and medical materials. A polymer coating can be utilized either to make water-insoluble fillers into a form that is water soluble, or to make water-soluble fillers into a form that is water insoluble. A polymer coating on the filler may also be utilized as a means to time drug-release from a nanoparticle. A polymer coating may further be used to enable selective filtering, transfer, capture, and removal of species and molecules from blood into the nanoparticle.

A nanoparticulate filler for biomedical operations might be a carrier or support for a drug of interest, participate in the drug's functioning, or might even be the drug itself. Possible administration routes include oral, topical, and injection routes. Nanoparticulates and nanocomposites may also have utility as markers or as carriers for markers. Their unique properties, including high mobility and unusual physical properties, make them particularly well-adapted for such tasks.

In some examples of biomedical functions, magnetic nanoparticles such as ferrites may be utilized to carry drugs to a region of interest, where the particles may then be concentrated using a magnetic field. Photocatalytic nanoparticles can be utilized to carry drugs to region of interest and then photoactivated. Thermally sensitive nanoparticles can similarly be utilized to transport drugs or markers or species of interest and then thermally activated in the region of interest. Radioactive nanoparticulate fillers may have utility for chemotherapy. Nanoparticles suitably doped with genetic and culture material may be utilized in similar way to deliver therapy in target areas. Nanocomposites may be used to assist in concentrating the particle and then providing the therapeutic action. To illustrate, magnetic and photocatalytic nanoparticles may be formed into a composite, administered to a patient, concentrated in area of interest using magnetic field, and finally activated using photons in the concentrated area. As markers, nanoparticulate fillers—coated or uncoated—may be used for diagnosis of medical conditions. For example, fillers may be concentrated in a region of the body where they may be viewed by magnetic resonance imaging or other techniques. In all of these applications, the possibility exists that nanoparticulates can be released into the body in a controlled fashion over a long time period, by implanting a nanocomposite material having a bioabsorbable matrix, which slowly dissolves in the body and releases its embedded filler.

As implants, nanostructured fillers and composites are expected to lower wear rate and thereby enhance patient acceptance of surgical procedures. Nanostructured fillers may also be more desirable than micron-scale fillers, because the possibility exists that their domain size may be reduced to low enough levels that they can easily be removed by normal kidney action without the development of stones or other adverse side effects. While nanoparticulates may be removed naturally through kidney and other organs, they may also be filtered or removed externally through membranes or otherwise removed directly from blood or tissue. Carrier nanoparticulates may be reactivated externally through membranes and reused; for example, nutrient carriers may be removed from the bloodstream, reloaded with more nutrients, and returned to carry the nutrients to tissue. The reverse process may also be feasible, wherein carriers accumulate waste products in the body, which are removed externally, returning the carriers to the bloodstream to accumulate more waste products.

EXAMPLES

Example 1

Indium Tin Oxide Fillers in PMMA

A stoichiometric (90 wt % In2O3 in $SnO_2$) indium tin oxide (ITO) nanopowder was produced using the methods of copending patent application Ser. No. 09/046,465. 50 g of indium shot was placed in 300 ml of glacial acetic acid and 10 ml of nitric acid. The combination, in a 1000 ml Erlenmeyer flask, was heated to reflux while stirring for 24 hours. At this point, 50 ml of $HNO_3$ was added, and the mixture was heated and stirred overnight. The solution so produced was clear, with all of the indium metal dissolved into the solution, and had a total final volume of 318 ml. An equal volume (318 mL) of 1-octanol was added to the solution along with 600 mL ethyl alcohol in a 1000 mL HDPE bottle, and the resulting mixture was vigorously shaken. 11.25 ml of tetrabutyltin was then stirred into the solution to produce a clear indium/tin emulsion. When the resulting emulsion was burned in air, it produced a brilliant violet flame. A yellow nanopowder residue was collected from the flamed emulsion. The nanopowder surface area was 13.5 $m^2/gm$, and x-ray diffractometer mean grain size was 60 nm.

Figure 2:
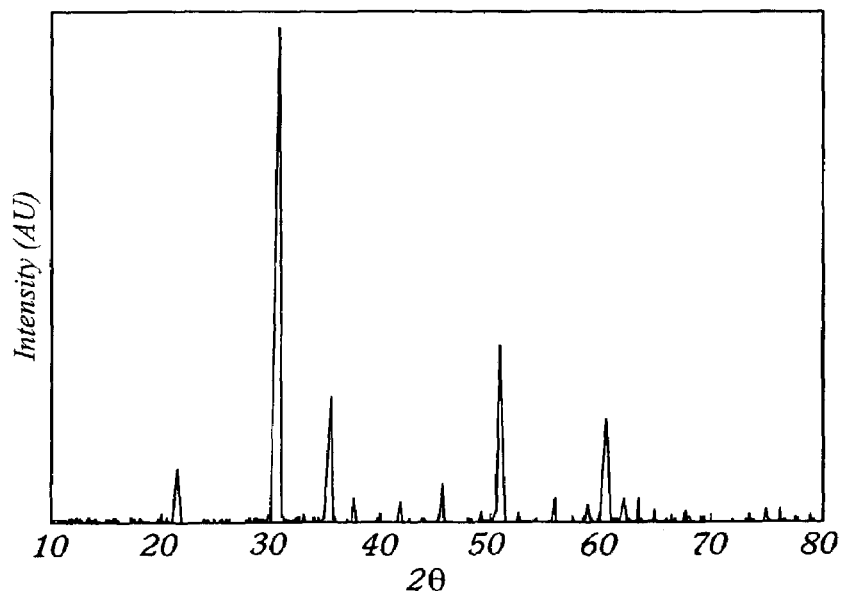
FIG. 2 portrays an X-ray diffraction (XRD) spectrum for the stoichiometric indium tin oxide powder of Example 1.
Figure 3:
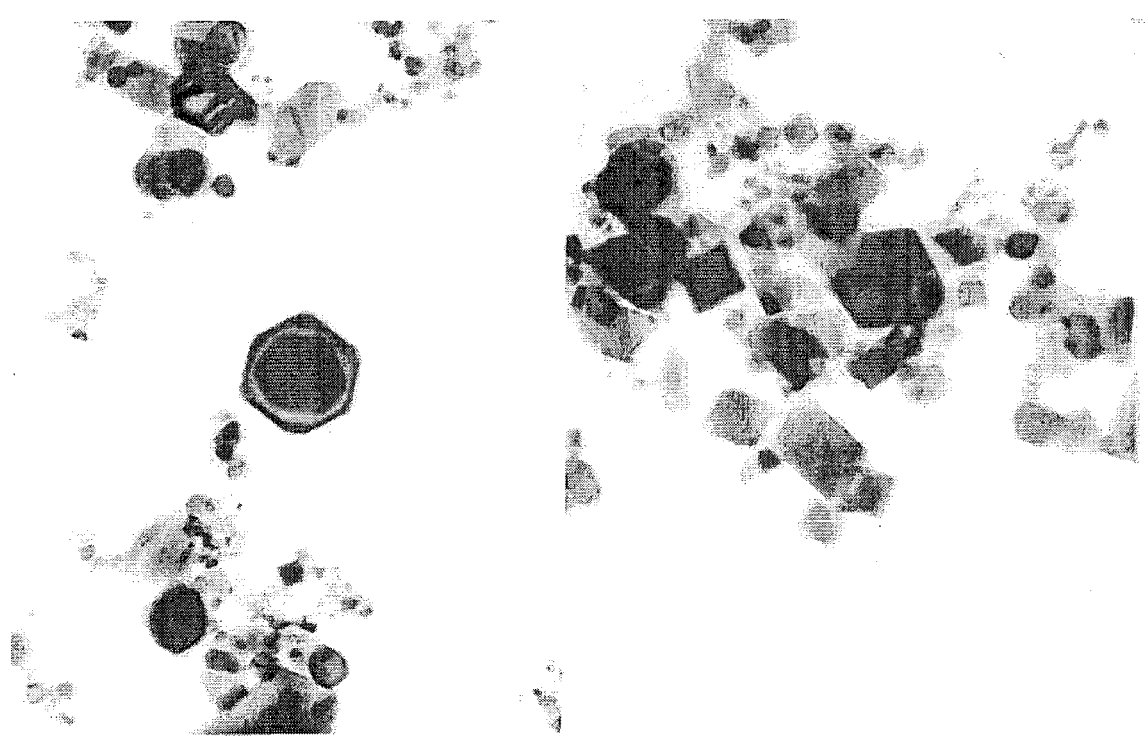
FIG. 3 is a scanning electron microscope (SEM) micrograph of the stoichiometric indium tin oxide powder of Example 1.

FIG. 2 shows the measured X-ray diffraction (XRD) spectrum for the powder, and FIG. 3 shows a scanning electron microscope (SEM image of the powder. These data show that the powder was of nanometer scale.

The nanostructured powder was then mixed with poly (methyl methacrylate) (PMMA) in a ratio of 20 vol % powder to 80 vol % PMMA. The powder and the polymer were mixed using a mortar and pestle, and then separated into three parts, each of which was pressed into a pellet. The pellets were pressed by using a Carver hydraulic press, pressing the mixture into a ¼ inch diameter die using a 1500 pound load for one minute.

After removal from the die, the physical dimensions of the pellets were measured, and the pellets were electroded with silver screen printing paste (Electro Sciences Laboratory 9912-F).

Pellet resistances were measured at 1 volt using a Megohmmeter/IR tester 1865 from QuadTech with a QuadTech component test fixture. The volume resistivity was calculated for each pellet using the standard relation, $$\rho = R\left(\frac{A}{t}\right) \quad (1)$$

where $\rho$ represents volume resistivity in ohm-cm, R represents the measured resistance in ohms, A represents the area of the electroded surface of the pellet in cm$^2$, and t represents the thickness of the pellet in cm. The average volume resistivity of the stoichiometric ITO composite pellets was found to be $1.75 \times 10^4$ ohm-cm.

Another quantity of ITO nanopowder was produced as described above, and was reduced by passing 2 SCFM of forming gas (5% hydrogen in nitrogen) over the powder while ramping temperature from 25° C. to 250° C. at 5° C./min. The powder was held at 250° C. for 3 hours, and then cooled back to room temperature. The XRD spectrum of the resulting powder indicated that the stoichiometry of the reduced powder was $In_{18}SnO_{29-x}$, with x greater than 0 and less than 29.

The reduced ITO nanopowder was combined with PMMA in a 20:80 volume ratio and formed into pellets as described above. The pellets were electroded as described, and their resistivity was measured. The average resistivity for the reduced ITO composite pellets was found to be $1.09 \times 10^4$ ohm-cm.

For comparison, micron scale ITO was purchased from Alfa Aesar (catalog number 36348), and was formed into pellets with PMMA and electroded as described above. Again, the volume fraction of ITO was 20%. The average measured resistivity of the micron scale ITO composite pellets was found to be $8.26 \times 10^8$ ohm-cm, representing a difference of more than four orders of magnitude from the nanoscale composite pellets. It was thus established that composites incorporating nanoscale fillers can have unique properties not achievable by prior art techniques.

Example 2

Hafnium Carbide Fillers in PMMA

Nanoscale hafnium carbide fillers were prepared as described in copending U.S. patent application Ser. Nos. 08/706,819 and 08/707,341. The nanopowder surface area was 53.5 m$^2$/gm, and mean grain size was 16 nm. Micron scale hafnium carbide powder was purchased from Cerac (catalog number H-1004) for comparison.

Composite pellets were produced as described in Example 1, by mixing filler and polymer with a mortar and pestle and pressing in a hydraulic press. Pellets were produced containing either nanoscale or micron scale powder at three loadings: 20 vol % powder, 50 vol % powder, and 80 vol % powder. The pellets were electroded as described above, and their resistivities were measured. (Because of the high resistances at the 20% loading, these pellets' resistivities were measured at 100V. The other pellets were measured at 1V, as described in Example 1).

Results of these resistivity measurements are summarized in Table 1. As can be seen, the resistivity of the pellets differed substantially between the nanoscale and micron scale powders. The composites incorporating nanoscale powder had a somewhat decreased resistivity compared to the micron scale powder at 20% loading, but had a dramatically increased resistivity compared to the micron scale powder at 50% and 80% loading.

TABLE 1

| Volume % filler | Resistivity of nanoscale powder composite (ohm-cm) | Resistivity of micron scale powder composite (ohm-cm) |
| --- | --- | --- |
| 20 | $5.54 \times 10^{12}$ | $7.33 \times 10^{13}$ |
| 50 | $7.54 \times 10^9$ | $2.13 \times 10^4$ |
| 80 | $3.44 \times 10^9$ | $1.14 \times 10^4$ |

Example 3

Copper Fillers in PMA and PVA

Nanoscale copper powders were produced as described in U.S. patent application Ser. Nos. 08/706,819 and 08/707,341. The nanopower surface area was 28.1 m2/gm, and mean grain size was 22 nm. Micron scale copper powder was purchased from Aldrich (catalog number 32645-3) for comparison.

The nanoscale and micron scale copper powders were each mixed at a loading of 20 vol % copper to 80 vol % PMMA and formed into pellets as described above. In addition, pellets having a loading of 15 vol % copper in poly(vinyl alcohol) (PVA) were produced by the same method. The pellets were electroded and resistivities measured at 1 volt as described in Example 1. Results are shown in Table 2.

TABLE 2

| Additive | Polymer | Volume % filler | Volume Resistivity (ohm-cm) |
| --- | --- | --- | --- |
| nanoscale copper | PMMA | 20 | $5.68 \times 10^{10}$ |
| nanoscale copper | PVA | 15 | $4.59 \times 10^5$ |
| micron scale copper | PMMA | 20 | $4.19 \times 10^{12}$ |

It can be seen from Table 2 that the resistivity of the nanoscale copper powder/PMMA composite was substantially reduced compared to the micron scale copper powder/PMMA composite at the same loading, and that the resistivity of the nanoscale copper powder/PVA composite was lower still by five orders of magnitude.

Example 4

Preparation of Polymer-Coated Nanostructured Filler

The stoichiometric (90 wt % $In_2O_3$ in $SnO_2$) indium tin oxide (ITO) nanopowder of Example 1 was coated with a polymer as follows.

200 milligrams of ITO nanopowders with specific surface area of 53 m$^2$/gm were added to 200 ml of demineralized water. The pH of the suspension was adjusted to 8.45 using ammonium hydroxide. In another container, 200 milligrams of poly(methyl methacrylate) (PMMA) was dissolved in 200 ml of ethanol. The PMMA solution was warmed to 100° C. while being stirred. The ITO suspension was added to the PMMA solution and the stirring and temperature of 100° C. was maintained till the solution reduced to a volume of 200 ml. The solution was then cooled to room temperature to a very homogeneous solution with very light clear-milky color. The optical clarity confirmed that the powders are still nanostructured. The powder was dried in oven at 120° C. and its weight was measured to be 400 milligrams. The increase in weight, uniformity of morphology and the optical clarity confirmed that the nanopowders were coated with PMMA polymer.

The electrochemical properties of polymer coated nanopowders were different than the as-produced nanopowders. The as-produced nanopowder when suspended in demineralized water yielded a pH of 3.4, while the polymer coated nanopowders had a pH of 7.51.

Example 5

Preparation of Electrical Device Using Nanostructured Fillers

A complex oxide nanoscale filler having the following composition was prepared: $Bi_2O_3$ (48.8 wt %), NiO (24.4 wt %), CoO (12.2 wt %), $Cr_2O_3$ (2.4 wt %), MnO (12.2 wt %), and $Al_2O_3$ (<0.02 wt %). The complex oxide filler was prepared from the corresponding nitrates of the same cation. The nitrates of each constituent were added to 200 mL of deionized water while constantly stirring. Hydroxides were precipitated with the addition of 50 drops of 28-30% $NH_4OH$. The solution was filtered in a large buchner funnel and washed with deionized water and then with ethyl alcohol. The powder was dried in an oven at 80° C. for 30 minutes. The dried powder was ground using a mortar and pestle. A heat treatment schedule consisting of a 15° C./min ramp to 350° C. with a 30 minute dwell was used to calcine the ground powder.

The nanofiller was then incorporated at a loading of 4% into a zinc oxide ceramic matrix. The composite was prepared by mechanically mixing the doped oxide nanofiller powder with zinc oxide powder, incorporating the mixture into a slurry, and screen printing the slurry (further described below). For comparison, devices were made using both a nanoscale matrix powder produced by the methods of copending and commonly assigned U.S. application Ser. No. 08/706,819, and using a micron scale matrix powder purchased from Chemcorp. The fillers and the matrix powders were mixed mechanically using a mortar and pestle.

Using the filler-added micron scale powder, a paste was prepared by mixing 4.0 g of powder with 2.1 g of a commercial screen printing vehicle purchased from Electro Science Laboratories (ESL vehicle 400). The doped nanoscale powder paste was made using 3.5 g powder and 3.0 g ESL vehicle 400. Each paste was mixed using a glass stir rod. Silver-palladium was used as a conducting electrode material. A screen with a rectangular array pattern was used to print each paste on an alumina substrate. First a layer of silver-palladium powder (the lower electrode) was screen printed on the substrate and dried on a hot plate. Then the ceramic filled powder was deposited, also by screen printing. Four print-dry cycles were used to minimize the possibility of pinhole defects in the varistor. Finally, the upper electrode was deposited.

Figure 4:
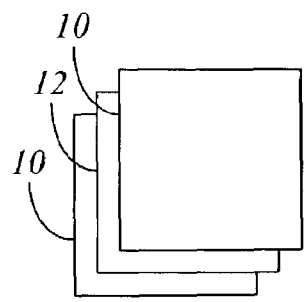
FIG. 4 is a diagram of the nanostructured varistor of Example 5.

The electrode/composite/electrode varistor was formed as three diagonally offset overlapping squares, as illustrated in FIG. 4. The effective nanostructured-filler based composite area in the device due to the offset of the electrodes was 0.036 in² (0.2315 cm²). The green thick films were co-fired at 900° C. for 60 minutes. The screen printed specimen is shown in FIG. 4, where light squares 10 represent the silver-palladium electrodes, and dark square 12 represents the composite layer.

Silver leads were attached to the electrodes using silver epoxy. The epoxy was cured by heating at a 50° C./min ramp rate to 600° C. and then cooling to room temperature at a rate of 50° C./min. The TestPoint computer software, in conjunction with a Keithley® current source, was used to obtain a current-voltage curve for each of the varistors. Testpoint and Keithley are trademarks or registered trademark of Keithley Scientific Instruments, Inc.

The electrode/micron scale matrix composite/electrode based varistor device had a total thickness of 29-33 microns and a composite layer thickness of 19 microns. The electrode/nanoscale matrix composite/electrode based varistor device had a total thickness of 28-29 microns and a composite layer thickness of 16 microns. Examination of current-voltage response curves for both varistors showed that the nanostructured matrix varistor had an inflection voltage of about 2 volts, while the inflection voltage of the micron scale matrix varistor had an inflection voltage of about 36 volts. Fitting the current-voltage response curves to the standard varistor power-law equation $$I=nV^a \tag{2}$$

yielded values of voltage parameter a of 2.4 for the micron-scale matrix device, and 37.7 for the nanoscale matrix device. Thus, the nonlinearity of the device was shown to increase dramatically when the nanoscale matrix powder was employed.

Example 6

Thermal Battery Electrode Using a Nanostructured Filler

Thermal batteries are primary batteries ideally suited for military ordinance, projectiles, mines, decoys, torpedoes, and space exploration systems, where they are used as highly reliable energy sources with high power density and extremely long shelf life. Thermal batteries have previously been manufactured using techniques that place inherent limits on the minimum thickness obtainable while ensuring adequate mechanical strength. This in turn has slowed miniaturization efforts and has limited achievable power densities, activation characteristics, safety, and other important performance characteristics. Nanocomposites help overcome this problem, as shown in the following example.

Three grams of raw $FeS_2$ powder was mixed and milled with a group of hard steel balls in a high energy ball mill for 30 hours. The grain size of produced powder was 25 nm. BET analysis showed the surface area of the nanopowder to be 6.61 m²/gm. The TEM images confirmed that the ball milled $FeS_2$ powder consists of the fine particles with the round shape, similar thickness and homogenous size. The cathode comprised $FeS_2$ nanopowders (68%), eutectic LiCl—KCl (30%) and $SiO_2$ (2%) (from Aldrich Chemical with 99% purity). The eutectic salts enhanced the diffusion of Li ions and acted as a binder. Adding silicon oxide particles was expected to immobilize the LiCl—KCl salt during melting. For comparison, the cathode pellets were prepared from nanostructured and micron scale $FeS_2$ powders separately.

To improve electrochemical efficiencies and increase the melting point of anode, we chose micron scale Li 44%-Si 56% alloy with 99.5% purity (acquired from Cyprus Foote Mineral) as the anode material in this work. A eutectic salt, LiCl 45%-KCl 55% (from Aldrich Chemical with 99% purity), was selected as electrolyte. The salt was dried at 90° C. and fused at 500° C. To strengthen the pellets and prevent flowing out of electrolyte when it melted, 35% MgO (Aldrich Chemical, 99% purity) powder was added and mixed homogeneously with the eutectic salt powder.

The pellets of anode electrodes were prepared by a cold press process. A hard steel die with a 20 mm internal diameter was used to make the thin disk pellets. 0.314 grams of Li 44%-Si 56% alloy powder (with 76-422 mesh particle size) was pressed under 6000 psi static pressure to form a pellet. The thickness and density of the pellets so obtained was determined to be 0.84 mm and 1.25 g/cm$^2$, respectively. Electrolyte pellets were produced using 0.55 grams of blended electrolyte powder under 4000 psi static pressure. The thickness and density of the pellets obtained were 0.84 mm and 2.08 g/cm$^2$ respectively. The cathode pellet was prepared using 0.91 grams of mixed micron scale FeS$_2$—LiCl—KCl—SiO$_2$ powder pressed under 4000 psi static pressure. The thickness and density of the pellets obtained were 0.86 mm and 3.37 g/cm$^2$, respectively.

A computerized SOLARTRON® 1287 electrochemical interface and a 1260 Gain/Phase Analyzer were employed to provide constant current and to monitor variation in potential between anode and cathode of cells during the discharging. "Solartron" is a registered trademark of the Solartron Electronic Group, Ltd. The cutoff potential of discharge was set at 0.8 volt. The thermal battery with the nanocomposite cathode provided 1 A constant current for 246 seconds, until the potential fell to 0.8 volt. It was observed that the power density of the nanostructured single cell thermal battery was 100% higher than that achievable with micron sized materials. Thus, nanoscale fillers can help enhance the electrochemical performance of such a device.

Example 7

A Magnetic Device Using Nanostructured Ferrite Fillers

Ferrite inductors were prepared using nanostructured and micron-scale powders as follows. One-tenth of a mole (27.3 grams) of iron chloride hexahydrate (FeCl$_3$-6H$_2$O) was dissolved in 500 ml of distilled water along with 0.025 moles (3.24 grams) of nickel chloride (NiCl$_2$) and 0.025 moles (3.41 grams) of zinc chloride (ZnCl$_2$). In another large beaker, 25 grams of NaOH was dissolved in 500 ml of distilled water. While stirring the NaOH solution rapidly, the metal chloride solution was slowly added, forming a precipitate instantaneously. After 1 minute of stirring, the precipitate solution was vacuum filtered while frequently rinsing with distilled water. After the precipitate had dried enough to cake and crack, it was transferred to a glass dish and allowed to dry for 1 hour in an 80° C. drying oven. At this point, the precipitate was ground with a mortar and pestle and calcined in air at 400° C. for 1 hour to remove any remaining moisture and organics.

BET analysis of the produced powder yielded a surface area of 112 m$^2$/g, confirming the presence of nanometer-sized individual particles with an estimated BET particle size of 11 nm. XRD analyses of all nanoscale powders showed the formation of a single (Ni, Zn)Fe$_2$O$_4$ ferrite phase with peak shapes characteristic of nanoscale powders. XRD peak broadening calculations reported an average crystallite size of 20 nm of the thermally quenched powders and 8 nm for the chemically derived powders. SEM-EDX analyses of sintered nanopowder pellets showed an average composition of 14.8% NiO, 15.8% ZnO, and 69.4% Fe$_2$O$_3$, which corresponded to the targeted stoichiometric composition of the Ni$_{0.5}$Zn$_{0.5}$Fe$_2$O$_4$.

Nanoscale ferrite filler powders were uniaxially pressed at 5000 pounds in a quarter-inch diameter die set into green pellets. The powders were mixed with 2 weight percent Duramax® binder for improved sinterability. The amount of powder used for pressing varied from 1.5 to 1.7 grams, typically resulting in cylinders having a post-sintered height of approximately 1.5 cm. To avoid cracking and other thermal stress effects, a multi-level heating profile was employed. The pellets were fired at a rate of 5° C./min to 300° C., 10° C./min to 600° C., and 20° C./min to the final sintering temperature, where it was held for four hours. Pellets were cooled from the sintering temperature at a rate of 10° C./min to ensure the sintering temperature ranged from 900° C. to 1300° C., but was typically greater than 1200° C. to ensure an acceptable density. Sintered pellets were then wound with 25 turns of 36 gauge enamel coated wire, the wire ends were stripped, and the completed solenoids where used for electrical characterization. An air coil was prepared for the purpose of calculating magnetic properties. This coil was created by winding 25 turns of the enamel coated wire around the die plunger used previously. This coil was taped with masking tape, slid off the plunger slowly to maintain shape and characteristics, and was characterized along with the ferrite solenoids.

Inductance characterization was performed with a Hewlett-Packard 429A RF Impedance/Materials Analyzer. Impedance, parallel inductance, q factor, and impedance resistance were measured over a logarithmic frequency sweep starting at 1 MHz and ending at 1.8 GHz. Values for permeability (μ) and loss factor (LF) were calculated from inductance (L), air coil inductance (L$_o$), and impedance resistance (R) using the following equations:

$$\mu = \frac{L}{L_0} \qquad (3)$$

$$LF = \frac{L_0 R}{\omega L^2} \qquad (4)$$

Resistivity measurements were made with a Keithley® 2400 SourceMeter using a four-wire probe attachment and TestPoint data acquisition software. Voltage was ramped from 0.1 to 20 volts while simultaneously measuring current. The results were plotted as field (voltage divided by pellet thickness) versus current density (current divided by electrode cross sectional area). The slope of this graph gives material resistivity (ρ).

Table 3 summarizes electrical properties of inductors prepared from micron-sized powder or from nanopowder. In most cases there is an advantage to using nanoscale precursor powder instead of micron-sized powder. It is important to keep in mind that all measurements were taken from cylindrical devices, which have inherently inefficient magnetic properties. Solenoids of this shape were used in this study because of the ease of production and excellent reproducibility. All measured properties would be expected to improve with the use of higher magnetic efficiency shapes such as cores or toroids, or by improving the aspect ratio (length divided by diameter) of the cylindrical samples.

TABLE 3

| | Loss Factor @ 1 MHz | | | Critical Frequency | |
|---|---|---|---|---|---|
| | Micron | Nano | | Micron | Nano |
| Average | 0.0032 | 0.0025 | Average | 68.9 MHz | 78.3 MHz |
| | Q Factor @ 1 MHz | | | Resistivity | |
| | Micron | Nano | | Micron | Nano |
| Average | 37.2 | 52.2 | Average | 0.84 MΩ | 33.1 MΩ |

The inductors made from ferrite nanopowders exhibited significantly higher Q-factor, critical resonance frequency, and resistivity. They also exhibited more than 20% lower loss factor as is desired in commercial applications.

Examples 8-10, presented below, were described originally in U.S. Pat. No. 5,984,997 which has been incorporated by reference into this specification.

Example 8

Tungsten Oxide

Ammonium meta-tungstate (55 g) was placed in a 500 ml beaker with ethylene glycol (100 mL). This mixture was stirred to form a clear solution. While stirring, 500 mL of Igepal®. 520-CO and 500 mL of naphtha were added to the solution, yielding a clear emulsion tungstate/glycol solution (polar phase) in naptha (non-polar phase). The Igepal® 520-CO served as an emulsifying agent. Igepal is a registered trademark of Rhone-Poulenc Surfactants and Specialties, L.P.

Combustion of the emulsion produced an incandescent flame. A yellow powder, characteristic of tungsten oxide, was visible depositing within the combustion chamber. TEM and SEM observations indicated that the powder consisted of particles with both equiaxed (<100 nm) and acicular morphologies (e.g., 10×100 nm), and that the powder comprised solely sub-micron particles. These particle sizes are corroborated by X-ray diffraction data, suggesting crystallite sizes ranging from 14 to 33 nm for the primary peaks of the hexagonal $WO_3$ powder, a mean minimum domain size of about 25 nm and a standard deviation of about 7 nm. The specific surface area as measured by Brunauer, Emmett, and Teller analysis (described in more detail in Brunauer, et al., J. Am. Chem. Soc., 60:309, 1938, and hereinafter referred to as BET) was 31.5 $m^2/g$, giving a 30 nm equivalent spherical diameter. The experiment also produced $WO_3$ nanowhiskers and nanorods with aspect ratios ranging from 5 to 15.

Example 9

Tungsten-Doped Tin Oxide

Ammonium meta-tungstate (7.95 g) was placed in a 500 ml beaker with ethylene glycol (10 mL). This mixture was stirred to form a clear solution. While stirring, 200 mL of Igepal® 520-CO and 200 mL of naphtha were added to the solution, yielding a clear emulsion tungstate/glycol solution (polar phase) in naptha (non-polar phase). The Igepal® 520-CO served as an emulsifying agent. Tetrabutyl tin (98.37 g) was added to the solution and naphtha was added to make a 700 mL volume.

Flaming of the emulsion produced an incandescent flame. A steel-blue powder was collected and characterized. The powder consists of faceted and equiaxed particles ranging from 10 to 75 nm showing solely sub-micron powder. Both nanowhiskers and equiaxed particles are present. The aspect ratios of the nanowhiskers were in the range of 3-20. Crystallite sizes as measured by X-ray diffraction range from 20 to 30 nm for the primary peaks of the $SnO_2$ powder, and there are no apparent secondary phases attributable to tungsten. The mean minimum domain size as calculated from the XRD data was about 27 nm and the standard deviation was estimated to be about 10 nm. The presence of tungsten was confirmed by X-Ray Electron Diffraction Spectroscopy (XEDS) both in the SEM and the TEM. The BET specific surface area was 35 $m^2/g$, giving an equivalent spherical diameter of about 20-30 nm.

Example 10

Copper Doped Nickel Zinc Ferrite

Commercially purchased metal-carboxylate emulsions (OMG Americas, Westlake, Ohio) were combined to form a clear emulsified solution that would yield the appropriate metal ratios to synthesize 300 g of the oxide. Flaming of the emulsion produced a brilliant incandescent flame. A chocolate-brown powder was collected and characterized. XRD data yielded crystallite sizes in the range of 20-40 nm, and indicated that the powder was a phase-pure spinel ferrite. The presence of all constituent elements was confirmed by XEDS in the SEM. The mean particle size of the powder was about 29 nm and the standard deviation was about 8 nm.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

A primary aspect of this invention lies in the discovery that the size and size distribution of nanopowders produced by vapor condensation can be controlled by interrupting the growth process through ultra-rapid thermal quenching of the condensing vapor. Another critical aspect of the invention is the realization that Joule-Thompson adiabatic expansion provides a controllable process for quenching such condensing vapor at predetermined rates as high as $10^{6°}$ C./sec, or greater, as required for producing nanopowders of desired properties. A third, important aspect of the invention is the development of a converging-diverging nozzle to implement the adiabatic expansion process of the invention under predictable conditions for a variety of precursor materials and operating conditions.

Figure 7:
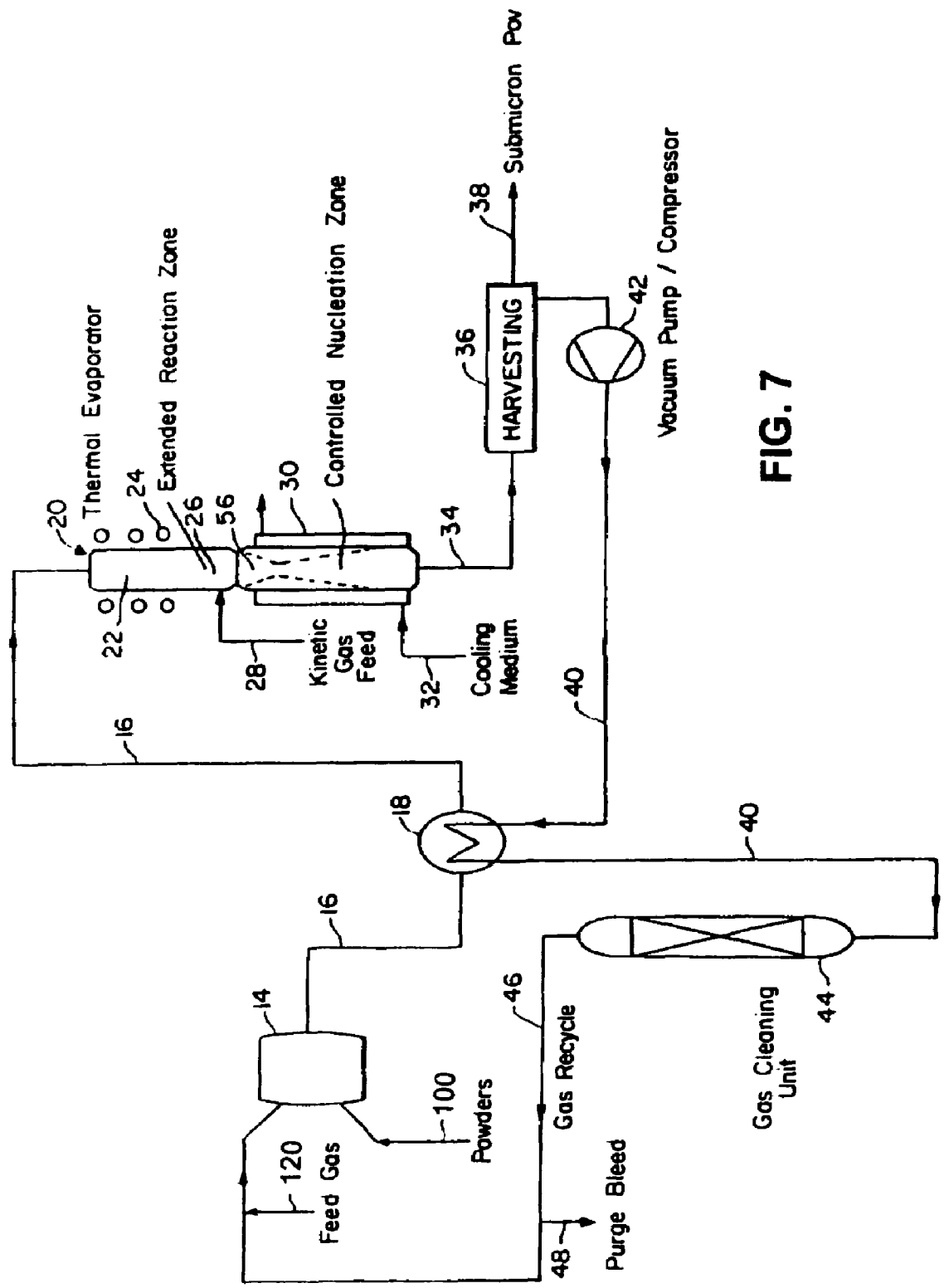
FIG. 7 is a schematic representation of the adiabetic-expansion, thermal quenching process of the present invention.

Referring to the drawings, wherein like parts are designated throughout with like numerals and symbols, FIG. 7 shows the process flow diagram and a schematic representation of the apparatus of the invention as applied to solid precursors, such as metals, alloys, ceramics, composites, and combinations thereof. It is understood that the process applies equivalently to other forms of precursors such as liquid, gaseous, slurry, and combinations thereof. A feed stream 100 of such a precursor material in powder form is premixed with a feed gas stream 120 (such as argon, helium, nitrogen, oxygen, hydrogen, water vapor, methane, air, or a combination thereof, depending on the particular precursor being processed and the corresponding atmosphere—inert, oxidizing, or reducing—required for the process) in mixing apparatus 14 appropriate to create a suspension. The powder 100 is suspended in the gas 120, preferably in a continuous operation, using fluidized beds, spouting beds, hoppers, or combinations thereof, as best suited to the nature of the precursor. The test runs performed to reduce the invention to practice were conducted with precursor feeds having particle size greater than 1 micrometer, but the process could be used with any size suitable for its continuous vaporization in a gas stream. The resulting gas-stream suspension 16 is advantageously preheated in a heat exchanger 18 and then is fed into a thermal reactor 20 where the suspended powder particles are partially or, preferably, completely evaporated in a thermal evaporation zone 22 by the input of thermal energy. The source 24 of such thermal energy may be internal energy, heat of reaction, conductive, convective, radiative, inductive, microwave, electromagnetic, direct or pulsed electric arc, nuclear, or combinations thereof, so long as sufficient to cause the rapid vaporization of the powder suspension being processed. Optionally, in order to prevent contamination of the vapor stream caused by partial sublimation or vaporization of the thermal reactor's interior walls, they may be pre-coated with the same material being processed.

The vaporized gas-stream suspension next enters an extended reaction zone 26 of the thermal reactor that provides additional residence time, as needed to complete the evaporation of the feed material and to provide additional reaction time (if necessary). As the stream leaves the reactor, it passes through a zone 56 where the thermokinetic conditions favor the nucleation of solid powders from the vaporized precursor. These conditions are determined by calculating the supersaturation ratio and critical cluster size required to initiate nucleation. Rapid quenching leads to high supersaturation which gives rise to homogeneous nucleation. The unstable vapor phase system self-nucleates on atomic clusters of critical size. Below the critical size, the clusters are unstable for a given supersaturation, while above the cluster size the free energy of the cluster is negative. For an ideal vapor phase, the radius of the critical cluster size is given by the relation $$r = 2\gamma V/kT \ln(P_1/P_\infty),$$

where $\gamma$ is the surface free energy, V is the molecular volume of the condensed phase, k is Boltzman's constant, $P_1$ is the pressure of the vapor in the system, and $P_\infty$ is the vapor pressure of the condensed phase. See G. S. Springer, Advances in Heat Transfer, 14, 281-341, Academic Press (1978).

Using titanium powder as an example, based on the physical properties of the feed material and operating conditions in the reactor (size=10μ, melting point=1,660° C., boiling point=3,287° C., heat of vaporization of titanium=10.985 Btu/g, hot gas temperature=4,000° C.), it is possible to calculate the residence time required for vaporization (2.32 msec for heating to melting point, 0.265 msec for melting, 5.24 msec for vaporization; total time required=8-10 msec). Based on the velocity of the suspension injected into the reactor and the travel distance through the reactor, one can determine that a velocity of about 46 ft/sec produces a residence time of 10.7 msec, sufficient for vaporization. If the process requires a predetermined thermokinetic state of the powder being processed which can be enhanced by the presence of a particular gas, a kinetic gas feed 28 (such as argon, helium, nitrogen, oxygen, hydrogen, water vapor, methane, air, or combinations thereof) can also be mixed with the precursor vapor to reach the desired thermokinetic state. As soon as the vapor has begun nucleation, the process stream is quenched in a converging-diverging nozzle-driven adiabatic expansion chamber 30 at rates at least exceeding $10^3$ K/sec, preferably greater than 106 K/sec, or as high as possible. As further detailed below, a cooling medium 32 is utilized for the converging-diverging nozzle to prevent contamination of the product and damage to the expansion chamber 30. Rapid quenching ensures that the powder produced is homogeneous, its size is uniform and the mean powder size remains in submicron scale.

The quenched gas stream 34 is filtered in appropriate separation equipment 36 to remove the submicron powder product 38 from the gas stream. As well understood in the art, the filtration can be accomplished by single stage or multistage impingement filters, electrostatic filters, screen filters, fabric filters, cyclones, scrubbers, magnetic filters, or combinations thereof. The filtered nanopowder product 38 is then harvested from the filter 36 either in batch mode or continuously using screw conveyors or gas-phase solid transport and the product stream is conveyed to powder processing or packaging unit operations (not shown in the drawings). The filtered gas stream 40 is compressed in a vacuum-pump/compressor unit 42 and cooled by preheating the gas-stream suspension 16 in heat exchanger 18. Thus, the enthalpy of compression can be utilized by the process as process heat through heat integration. Stream 40 is then treated in a gas cleaning unit 44 to remove impurities and any undesirable process product gases (such as CO, $CO_2$, $H_2O$, HCl, $NH_3$, etc). The gas treatment can be accomplished by single stage or multistage gas-gas separation unit operations such as absorption, adsorption, extraction, condensation, membrane separation, fractional diffusion, reactive separation, fractional separation, and combinations thereof. Finally, the treated gases 46 are recycled back to be reused with the feed gas stream 12. A small split stream 48 of the compressed treated gas 46 is purged to ensure steady state operation of the continuous thermal process.

Figure 5:
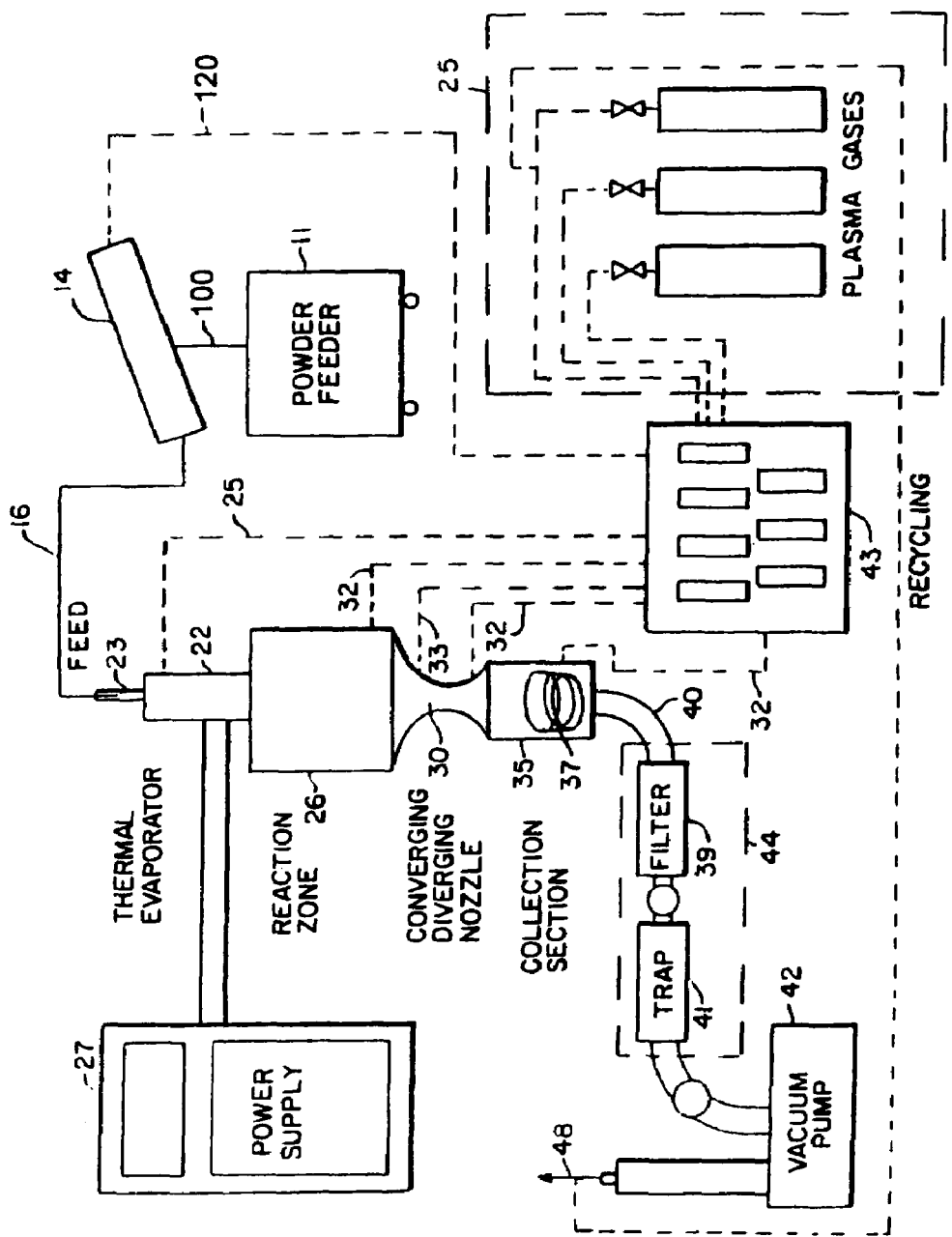
FIG. 5 is a schematic illustration of a pilot-plant process according to the preferred embodiment of the invention.

The invention was reduced to practice in a pilot plant illustrated schematically in FIG. 5. This thermal reactor system consists of an upper, cylindrical, thermal evaporation chamber 22 made of quartz and cooled by circulating water (not shown). The gas-stream suspension 16 is formed by mixing the solid feed material 100 fed by a powder feeder 11 with an inert gas stream 120, such as argon. The suspension 16 is injected continuously from the top of the thermal evaporation chamber 22 through a water-cooled injection probe 23 and it is heated inductively by means of an RF plasma torch 24 (consisting of a plasma-gas source 25 and a suitable power supply 27). The reactor also comprises another, cylindrical, extended reaction zone 26 made of stainless steel, water cooled, positioned downstream of the thermal evaporation zone 22, and sufficiently large to give the feed stream the residence time required to complete the vaporization and reaction. The reaction zone 26 is lined with a zirconia refractory felt and a layer of silicon-carbide refractory material to reduce heat losses from the hot reaction zone. If necessary to prevent contamination of the reacting fluid by the reactor or refractory material, the reactor's interior walls (and refractory lining) may be further lined with the same material constituting the solid feed.

Figure 6A:
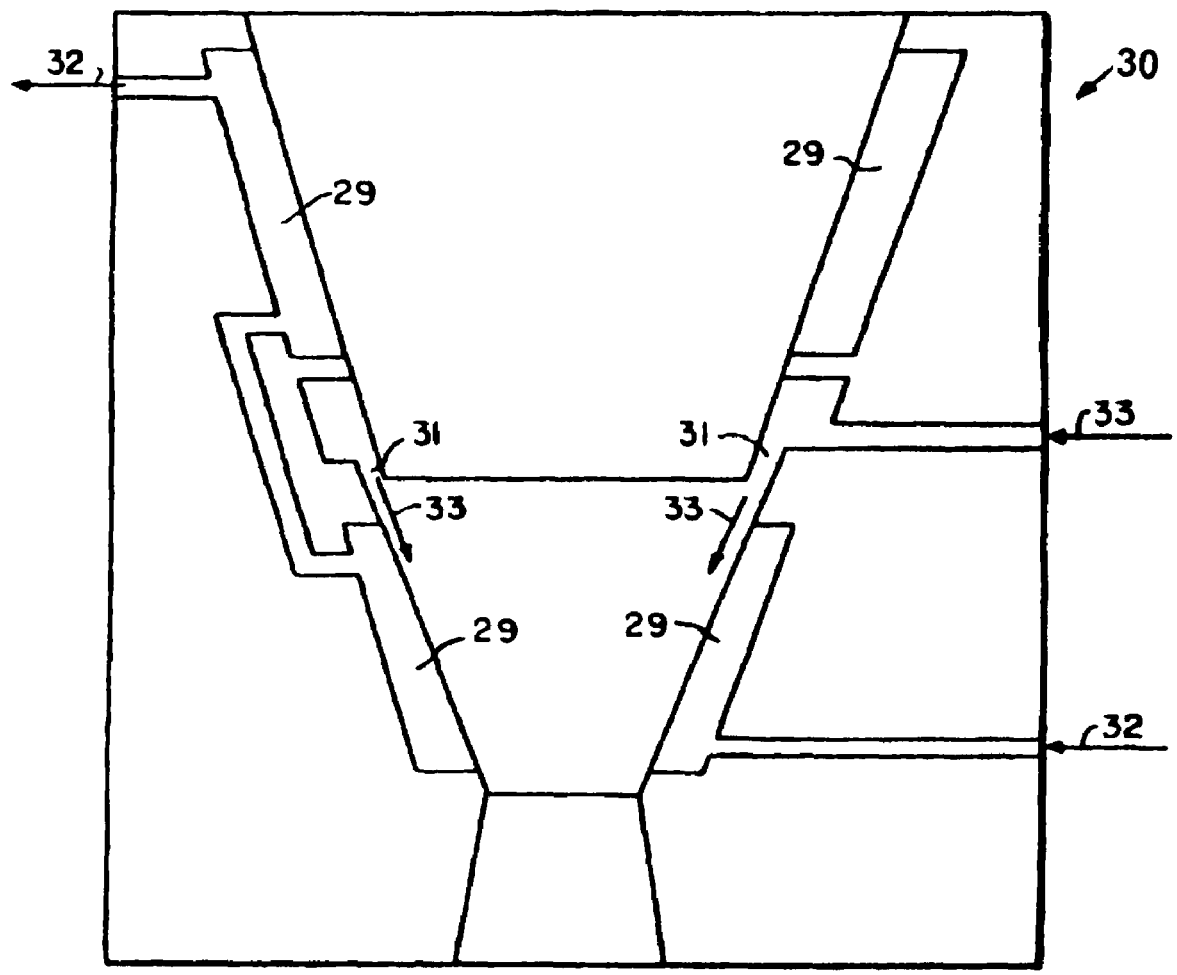
FIG. 6A is a schematic illustration of a converging-diverging expansion nozzle according to the preferred embodiment of the invention.
Figure 6B:
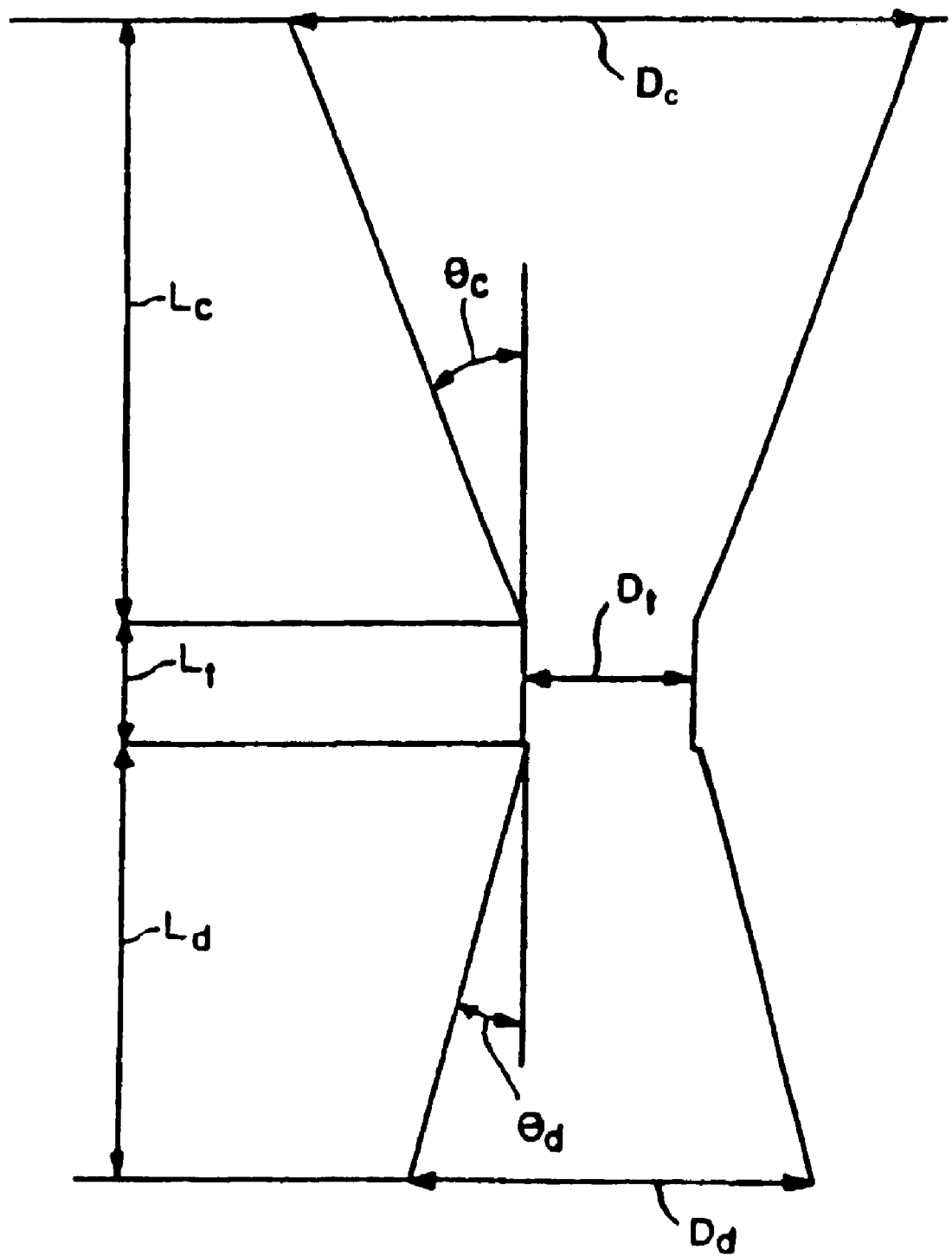
FIG. 6B is a simplified drawing of the expansion nozzle of the invention to illustrate the key design parameters for the process.

The adiabatic expansion chamber 30 consists of a converging-diverging nozzle, as illustrated in FIG. 6A, operated with a pressure drop (created by the vacuum pump 42 operated at 50 to 650 Torr) sufficient for quenching the high-temperature vapors produced by plasma induction upstream in the reactor. A simple schematic of such a converging-diverging nozzle is shown in FIG. 6B to illustrate the key design parameters of the device. They are the diameter $D_c$, the length $L_c$ and the converging angle $\Theta_c$ for the converging section; the diameter $D_d$, the length $L_d$ and the diverging angle $\Theta_d$ for the diverging section; and the diameter $D_t$ and length $L_t$ for the throat. For durability and continuous operation, it is necessary to keep the nozzle wall cool to avoid contamination of the quenched product with the material of construction of the nozzle or, in worst cases, even to avoid melt down and structural failure of the nozzle. Accordingly, the temperature of the nozzle is maintained low with a coolant 32, such as cooling water, circulating in a cooling jacket 29.

In addition, although lower nozzle-wall temperatures improve the contamination and failure problems, such lower temperatures can also lead to vapor condensation on the nozzle walls because of mechanisms such as thermophoresis. Vapor condensation can, in turn, lead to increasing restriction in the nozzle throat diameter, with subsequent closure of the throat and failure of the nozzle. We solved this additional problem by providing a gaseous boundary-layer stream 33 to form a blanket over the internal surface of the nozzle. The blanket gases can be introduced into the nozzle's interior wall axially, radially or tangentially, through an inlet port 31, and can be inert, such as argon or helium when metals and alloys are being processed; or reactive, such as nitrogen, when nitrides are being synthesized; or oxygen or air, when oxides are being processed; methane and hydrocarbons, when carbides are being processed; halogens when halides are being synthesized; or combinations thereof, depending on the ultimate material being synthesized. Thus, reactive gases can participate in heat transfer with the nucleation process, or reactively on powder surface to selectively modify the composition of the surface (coated powders), or reactively to transform the bulk composition of the powder, or in combinations to achieve multiple functions. This secondary gas feed 33 can help engineer the product nucleation process and the resultant characteristics of the powder.

The separation system 36 of the invention is realized by means of a collection chamber 35, attached to the outlet of the nozzle 30, where the very fine particles entrained in the gaseous stream are collected on a water-cooled metallic coil 37 (copper was used successfully for the test runs detailed below) and periodically extracted. It is anticipated that commercial-scale equipment would incorporate a screw or similar conveyor for the continuous removal of the nanopowder product from the collection chamber 35. The gas stream 40 out of the collection chamber is further passed through a filter 39 and trap 41 to thoroughly clean it prior to passage through the vacuum pump 42. A monitor and fluid-control panel 43 is utilized to monitor process variables (temperatures, pressures, water and gas flow rates), record them, and control all water and gas streams to maintain steady-state operation. It is noted that for simplicity the gas stream 48 exhausted from the vacuum pump 42 was not recycled in the demonstration plant of FIG. 5, but a commercial application would preferably do so for energy and material conservation.

The effectiveness of the invention was demonstrated by utilizing the system of FIG. 5 to produce nanosize powders of several different materials. In each case, the powders harvested were characterized for phases, size, morphology, and size distribution. X-ray diffraction (XRD) was used to determine the phases present in the samples using a Siemens D5000 difractometer with Ni-filtered Cu K$\alpha$ radiation. The peak widths for average grain size analysis were determined by a least-square fit of a Cauchy function. The average size of the powder produced was estimated by Scherrer's method. Transmission electron microscopy (Hitachi TEM H-8100 equipped with a Kevex.® EDX) was used for size, morphology, and size distribution. The particle size of the powders produced was in the nanometer range. Scanning electron microscopy (SEM) was used for the coarser size feed powders.

Example 11

Zinc: Commercially available zinc powder (−325 mesh) was used as the precursor to produce nanosize zinc powder. Feed zinc powder was fed into the thermal reactor suspended in an argon stream (argon was used as the plasma gas; the total argon flow rate was 2.5 ft$^3$/min). The reactor was inductively heated with 16 kW of RF plasma to over 5,000K in the plasma zone and about 3,000K in the extended reactor zone adjacent the converging portion of the nozzle. The vaporized stream was quenched through the converging-diverging nozzle. The preferred pressure drop across the nozzle was 250 Torr, but useful results were obtained at different pressure drops, ranging from 100 to 550 Torr. After undergoing a pressure drop of 100 to 550 Torr through the converging-diverging nozzle, the powder produced was separated from the gas by means of a cooled copper-coil-based impact filter followed by a screen filter. The nanosize powder produced by the invention was in the 5-25 nanometer range. The size distribution was narrow, with a mean size of approximately 15 nm and a standard deviation of about 7.5 nm. Variations in the operating variables (such as power input, gas pressure, gas flow rates, and nozzle throat size) affected the size of the powder produced. To avoid condensation at the wall, argon was introduced tangentially (radial or axial injections have also been proven to be effective) at the nozzle walls. The inert gas provided cooling as well as a boundary layer to act as a barrier for any condensation on the nozzle walls.

Example 12

Iron-Titanium Intermetallic: 2-5 micron powders of iron and 10-25 micron powders of titanium were mixed in 1:1 molar ratio and fed into the thermal reactor suspended in an argon stream (total gas flow rate, including plasma gas, was 2.75 ft$^3$/min). The reactor was inductively heated with 18 kW of RF plasma to over 5,000K in the plasma zone and above 3,000K in the extended reactor zone adjacent the converging portion of the nozzle. The vaporized stream was quenched through the converging-diverging nozzle. The preferred pressure drop across the nozzle was 250 Torr, but useful results were obtained at different pressure drops, ranging from 100 to 550 Torr. After undergoing a pressure drop of 100 to 550 Torr through the converging-diverging nozzle, the powder produced was separated from the gas by means of a cooled copper-coil-based impact filter followed by a screen filter. An SEM micrograph of the feed powders used showed that they were greater than 1 micrometer when fed. A TEM image of nanopowders produced by the invention showed them to be in the 10-45 nanometer range. The size distribution was narrow, with a mean size of approximately 32 nm and a standard deviation of about 13.3 nm. Variations in the operating variables affected the size of the powder produced. An XRD pattern of the product indicates that the phases formed were titanium, iron and iron-titanium intermetallic (FeTi). The phases present illustrate that the invention can produce nanoscale powders of metals and intermetallics. To avoid condensation at the wall, argon was introduced tangentially (radial or axial injections have also been proven to be effective) at the nozzle walls. The inert gas provided cooling as well as a boundary layer to act as a barrier for any condensation on the nozzle walls.

Example 13

Nickel-Aluminum Intermetallic: 1-4 micron powders of nickel and 10-30 micron powders of aluminum were mixed in 1:1 molar ratio and fed into the thermal reactor suspended in an argon stream (total feed, including plasma gas, at 2.75 ft$^3$/min). The reactor was inductively heated with 18 kW of RF plasma to over 5,000K in the plasma zone and above 3,000K in the extended reactor zone adjacent the converging portion of the nozzle. The vaporized stream was quenched through the converging-diverging nozzle. The preferred pressure drop across the nozzle was 250 Torr, but useful results were obtained at different pressure drops, ranging from 100 to 550 Torr. The powder produced was separated from the gas by means of a cooled copper-coil-based impact filter followed by a screen filter. A TEM image of the nanopowder produced by the invention showed it to be in the 10-30 nanometer range. The size distribution was narrow, with a mean size of approximately 16.4 nm and a standard deviation of about 5.2 nm. Variations in the operating variables affected the size of the powder produced. The XRD pattern of the product indicates that the phase formed was NiAl. The phases present illustrate that the invention can produce nanoscale powders of metals and intermetallics. To avoid condensation at the wall, argon was introduced tangentially at the nozzle walls. The inert gas provided cooling as well as a boundary layer to act as a barrier for any condensation on the nozzle walls.

Example 14

Tungsten Oxide: Commercially available tungsten oxide powder (−325 mesh size) was used as the precursor to produce nanosize WO$_3$. The tungsten oxide powder was suspended in a mixture of argon and oxygen as the feed stream (flow rates were 2.25 ft$^3$/min for argon and 0.25 ft$^3$/min for oxygen). The reactor was inductively heated with 18 kW of RF plasma to over 5,000K in the plasma zone and about 3,000K in the extended reactor zone adjacent the converging portion of the nozzle. The vaporized stream was quenched through the converging-diverging nozzle. The preferred pressure drop across the nozzle was 250 Torr, but useful results were obtained at different pressure drops, ranging from 100 to 550 Torr. After undergoing a pressure drop of 100 to 550 Torr through the converging-diverging nozzle, the powder produced was separated from the gas by means of a cooled copper-coil-based impact filter followed by a screen filter. The TEM nanograph of the WO$_3$ powder produced by the invention showed it to be in the 10-25 nanometer range. The size distribution was narrow, with a mean size of about 16.1 nm and a standard deviation of about 6.3 nm. Variations in the operating variables (such as power input, gas pressure, gas flow rates, and nozzle throat size) affected the size of the powder produced. An XRD pattern of the product indicates that the phase present was WO$_3$. To avoid condensation at the wall, argon was introduced tangentially at the nozzle walls. The inert gas provided cooling as well as a boundary layer to act as a barrier for any condensation on the nozzle walls.

Example 15

Cerium Oxide: Commercially available cerium oxide powder (5-10 micron size) was used as the precursor to produce nanosize CeO$_2$. The cerium oxide powder was suspended in a mixture of argon and oxygen as the feed stream (at total rates of 2.25 ft$^3$/min for argon and 0.25 ft$^3$/min for oxygen). The reactor was inductively heated with 18 kW of RF plasma to over 5,000K in the plasma zone and about 3,000K in the extended reactor zone adjacent the converging portion of the nozzle. The vaporized stream was quenched through the converging-diverging nozzle. The preferred pressure drop across the nozzle was 250 Torr, but useful results were obtained at different pressure drops, ranging from 100 to 650 Torr. The powder produced was separated from the gas by means of a cooled copper-coil-based impact filter followed by a screen filter. The TEM nanograph of the CeO$_2$ powder produced by the invention showed it to be in the 5-25 nanometer range. The size distribution was narrow, with a mean size of about 18.6 nm and a standard deviation of about 5.8 nm. Variations in the operating variables affected the size of the powder produced. An XRD pattern of the product indicates that the phase present was CeO$_2$. To avoid condensation at the wall, argon was introduced tangentially at the nozzle walls. The inert gas provided cooling as well as a boundary layer to act as a barrier for any condensation on the nozzle walls.

Example 16

Silicon Carbide: Commercially available silicon carbide powder (−325 mesh size) was used as the precursor to produce nanosize SiC. The powder was suspended in argon as the feed stream (total argon flow rate of 2.5 ft$^3$/min). The reactor was inductively heated with 18 kW of RF plasma to over 5,000K in the plasma zone and about 3,000K in the extended reactor zone adjacent the converging portion of the nozzle. The vaporized stream was quenched through the converging-diverging nozzle. The preferred pressure drop across the nozzle was 250 Torr, but useful results were obtained at different pressure drops, ranging from 100 to 550 Torr. The powder produced was separated from the gas by means of a cooled copper-coil-based impact filter followed by a screen filter. The TEM nanograph of the SiC powder produced by the invention showed it to be in the 10-40 nanometer range. The size distribution was narrow, with a mean size of approximately 28 nm and a standard deviation of about 8.4 nm. Variations in the operating variables affected the size of the powder produced. An XRD pattern of the product indicates that the phase present was SiC. To avoid condensation at the wall, argon was introduced tangentially at the nozzle walls. The inert gas provided cooling as well as a boundary layer to act as a barrier for any condensation on the nozzle walls.

Example 17

Molybdenum Nitride: Commercially available molybdenum oxide (MoO$_3$) powder (−325 mesh size) was used as the precursor to produce nanosize Mo$_2$N. Argon was used as the plasma gas at a feed rate of 2.5 ft$^3$/min. A mixture of ammonia and hydrogen was used as the reactant gases (NH$_3$ at 0.1 ft$^3$/min; H$_2$ at 0.1 ft$^3$/min). The reactor was inductively heated with 18 kW of RF plasma to over 5,000K in the plasma zone and about 3,000K in the extended reactor zone adjacent the converging portion of the nozzle. The vaporized stream was quenched through the converging-diverging nozzle. The preferred pressure drop across the nozzle was 250 Torr, but useful results were obtained at different pressure drops, ranging from 100 to 550 Torr. The powder produced was separated from the gas by means of a cooled copper-coil-based impact filter followed by a screen filter. The TEM nanograph of the $Mo_2N$ powder was produced by the invention, showing it to be in the 5-30 nanometer range. The size distribution was narrow, with a mean size of about 14 nm and a standard deviation of about 4.6 nm. Variations in the operating variables affected the size of the powder produced. An XRD pattern of the product indicates that the phase present was $Mo_2N$. To avoid condensation at the wall, argon was introduced tangentially at the nozzle walls. The inert gas provided cooling as well as a boundary layer to act as a barrier for any condensation on the nozzle walls.

Example 18

Nickel Boride Ceramic: 10-50 micron powder of nickel boride was fed into the thermal reactor with argon (fed at a total rate, including plasma gas, of 2.75 ft$^3$/min). Once again, the reactor was inductively heated with 18 kW of RF plasma to over 5,000K in the plasma zone and about 3,000K in the extended reactor zone adjacent the converging portion of the nozzle. The vaporized stream was quenched through the converging-diverging nozzle. The preferred pressure drop across the nozzle was 250 Torr, but useful results were obtained at different pressure drops, ranging from 100 to 550 Torr. The powder produced was separated from the gas by means of a cooled copper-coil-based impact filter followed by a screen filter. The SEM micrograph of the feed powders used demonstrated that they were greater than 1 micrometer when fed. The TEM nanograph of the $Ni_3B$ powder was produced by the invention, showing it to be in the 10 to 30 nanometer range. The size distribution was narrow, with a mean size of about 12.8 nm and a standard deviation of about 4.2 nm. Variations in the operating variables affected the size of the powder produced. An XRD pattern of the product indicates that the phase present were Ni and $Ni_3B$. To avoid condensation at the wall, argon was introduced tangentially at the nozzle walls. The inert gas provided cooling as well as a boundary layer to act as a barrier for any condensation on the nozzle walls.

Example 19

Oxide Ceramics: 5-10 micron powders of calcium carbonate were fed into the thermal reactor with argon (at 2.5 ft$^3$/min). The reactor was inductively heated with 16 kW of RF plasma to over 5,000K in the plasma zone and about 2,500K in the extended reactor zone adjacent the converging portion of the nozzle. The vaporized stream was quenched by thermal expansion to about 100 Torr. The pressure drop across the nozzle was 250 Torr, but useful results were obtained at different pressure drops, ranging from 50 to 550 Torr. The powder produced was separated from the gas by means of a cooled copper-coil-based impact filter followed by a screen filter. The TEM image of powder produced by the invention showed it to be in the 5 to 20 nanometer range. As expected from the calcination reaction occurring in the reactor, the XRD data established that the main phase of the nanopowder was CaO. Some other phases, such as $Ca(OH)_2$, were also present due to exposure to atmospheric moisture. The size distribution of the CaO was narrow, with a mean size of about 14.8 nm and standard deviation of about 3.8 nm.

An alternate run was made with $MgCO_3$ powders with mean size of about 7 microns processed with argon. Once again, nanoscale powders of MgO were produced as evidenced by TEM and XRD data. The final product powder size was observed to vary with changes in the pressure, temperature, flow rate, and compositions.

These examples demonstrate the feasibility and effectiveness of the principles of this invention in producing nanosize powders from micron-sized precursors. The process and apparatus of the invention, utilizing ultra-rapid quenching as the process step for the formation of nanopowders, provide a practical method for controlling the size of the product by manipulating process parameters. In particular, by controlling the quenching rate by changing the pressure drop over the expansion nozzle of the invention, we found that predetermined particle sizes and size distributions can be produced reliably in a continuous, steady-state process, which is easily scaleable for commercial bulk production. The process was proven viable for metals, alloys, intermetallics, ceramics, composites, and combinations thereof. In addition, we demonstrated that the process can utilize feeds of reactive components and produce submicron powders of corresponding thermodynamically-stable or metastable product species at high temperatures; that it is suitable for recycling and reusing product gases as feed gases; and for recycling and reusing any unseparated product powders as feed material. The method and apparatus of the invention solve many problems unresolved by existing processes to produce submicron powders in general and nanostructured materials in particular. Especially, the process is scaleable; it is solvent free and therefore inherently non-polluting and of low cost; it is flexible in relation to processing different feed materials; it allows simple control of product powder size and size distribution; and it does not utilize contaminating components in the feed or for processing, therefore yielding product powders that are as pure as the powders fed to the process.

Inasmuch as one of the primary inventive concepts of the invention is the effective thermal quenching and the attendant advantages produced by ultra-rapid expansion of a vaporized suspension of the feed material, it is clear that the concept could be applied as well to a system where the precursor material is in the form of a mass evaporated by any method in a low-pressure gas. Similarly, the process is applicable to liquid or gaseous precursors that are combined with one or more reactive gases in a reactor and then quenched ultra-rapidly according to the invention to produce nanosize particles with a narrow size distribution. For example, silicon tetrachloride (normally liquid at room temperature) can be reacted with methane to produce a silicon-carbide vapor which, rapidly quenched according to the invention, can produce a nanosize SiC powder. Similarly, silane ($SiH_4$, normally gaseous at room temperature) can be reacted with methane to produce a silicon-carbide vapor which can also be rapidly quenched to produce a nanosize SiC powder with a narrow size distribution. Finally, it is understood that specific changes in materials and procedures may be made by one skilled in the art to produce equivalent results.

We claim:

1. A pigment comprising polymetallic nanofillers, wherein the pigment is brown and wherein the polymetallic nanofillers are produced using a method comprising:
   providing a solution for each of one or more desired constituent elements of a desired polymetallic nanofiller;
   mixing the solutions containing each of the constituent elements of the desired polymetallic nanofiller to form a mix of solutions;
   preparing polymetallic nanofillers from the mix of solutions in a thermal plasma process;
   mixing the polymetallic nanofillers in a liquid matrix;
   coating the nanofillers with a polymer or a monomer; and wherein the polymetallic nanofillers have a domain size less than 100 nanometers.

2. The pigment of claim 1 wherein the liquid matrix comprises of an organic fluid.

3. A layer formed on a supporting structure wherein the layer is prepared from a composition comprising the pigment of claim 1.

4. The pigment of claim 1 wherein the polymetallic nanofillers comprise oxide.

5. The pigment of claim 1 wherein the polymetallic nanofillers comprise nanorods.

6. The pigment of claim 1 wherein the polymetallic nanofillers comprise nanowhiskers.

7. The pigment of claim 1 wherein the nanofillers comprise nitride.

8. A pigment comprising polymetallic nanofillers, wherein the polymetallic nanofillers are produced using a method comprising:
    providing a solution for each of one or more desired constituent elements of a desired polymetallic nanofiller;
    mixing the solutions containing each of the constituent elements of the desired polymetallic nanofiller to form a mix of solutions;
    preparing polymetallic nanofillers from the mix of solutions in a thermal plasma process;
    mixing the polymetallic nanofillers in a liquid matrix;
    coating the nanofillers with a polymer or a monomer; and
    wherein the polymetallic nanofillers have a domain size less than 100 nanometers and wherein the nanofillers comprise nitride.

9. The pigment of claim 8 wherein the liquid matrix comprises of an organic fluid.

10. A layer formed on a supporting structure wherein the layer is prepared from a composition comprising the pigment of claim 8.

11. The pigment of claim 8 wherein the polymetallic nanofillers comprise oxide.

12. The pigment of claim 8 wherein the polymetallic nanofillers comprise nanorods.

13. The pigment of claim 8 wherein the polymetallic nanofillers comprise nanowhiskers.

14. The pigment of claim 8 wherein the pigment is yellow.

15. The pigment of claim 8 wherein the pigment is blue.

* * * * *